US010598863B2

(12) United States Patent
Toba et al.

(10) Patent No.: US 10,598,863 B2
(45) Date of Patent: Mar. 24, 2020

(54) OPTICAL CONNECTOR, OPTICAL CABLE, AND ELECTRONIC DEVICE

(71) Applicant: SONY CORPORATION, Tokyo (JP)

(72) Inventors: Kazuaki Toba, Kanagawa (JP); Masanari Yamamoto, Kanagawa (JP); Ryohei Takahashi, Kanagawa (JP); Hiroshi Morita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/318,232

(22) PCT Filed: Aug. 2, 2017

(86) PCT No.: PCT/JP2017/028145
§ 371 (c)(1),
(2) Date: Jan. 16, 2019

(87) PCT Pub. No.: WO2018/030246
PCT Pub. Date: Feb. 15, 2018

(65) Prior Publication Data
US 2019/0162909 A1   May 30, 2019

(30) Foreign Application Priority Data

Aug. 10, 2016  (JP) ................................ 2016-157089
Nov. 17, 2016  (JP) ................................ 2016-223742

(51) Int. Cl.
*G02B 6/35* (2006.01)
*G02B 6/32* (2006.01)
*G02B 6/42* (2006.01)

(52) U.S. Cl.
CPC ............ *G02B 6/353* (2013.01); *G02B 6/32* (2013.01); *G02B 6/327* (2013.01); *G02B 6/4214* (2013.01); *G02B 2006/4297* (2013.01)

(58) Field of Classification Search
CPC ...... G02B 6/243; G02B 6/327; G02B 6/4263; G02B 6/4265; G02B 6/353; G02B 6/3813; G02B 6/383
See application file for complete search history.

(56) References Cited

U.S. PATENT DOCUMENTS 3,913,872 A * 10/1975 Weber .................... F21V 11/00
                                                                355/67
6,236,787 B1 * 5/2001 Laughlin .............. G02B 6/3833
                                                                385/43

(Continued)

FOREIGN PATENT DOCUMENTS

JP       2007-011060 A     1/2007

OTHER PUBLICATIONS

Jul. 23, 2019, European Search Report issued for related EP Application No. 17839317.9.

*Primary Examiner* — Rhonda S Peace
(74) *Attorney, Agent, or Firm* — Paratus Law Group, PLLC

(57) ABSTRACT

A laser hazard at the time of non-connection can be prevented with a simple structure. A cylindrical connector exterior, and a block that is incorporated in one end side of the connector exterior and in which a light emitting portion or a light incident portion is mounted toward another end side are included. The light emitting portion or the light incident portion is mounted on the block such that an optical axis direction of the light emitting portion or the light incident portion is inclined with respect to a longitudinal direction of the connector exterior. For example, the connector exterior has a length at which at least a part of light emitted from the light emitting portion can be emitted to an inner side (inner wall) of the connector exterior.

9 Claims, 18 Drawing Sheets

(56) References Cited

U.S. PATENT DOCUMENTS

| | | | |
|---|---|---|---|
| 6,351,584 B1 | 2/2002 | Horie et al. | |
| 6,964,529 B2 * | 11/2005 | Chien | G02B 6/4219 |
| | | | 385/25 |
| 7,589,915 B2 * | 9/2009 | Shimoguchi | G02B 3/00 |
| | | | 359/737 |
| 8,380,075 B2 * | 2/2013 | Sakigawa | G02B 6/4201 |
| | | | 398/128 |
| 9,025,917 B2 * | 5/2015 | Aoki | G02B 6/327 |
| | | | 385/33 |
| 2002/0039220 A1 | 4/2002 | Ishii et al. | |
| 2003/0147601 A1 * | 8/2003 | Bartur | G02B 6/4214 |
| | | | 385/92 |
| 2005/0047726 A1 * | 3/2005 | Hodgson | G02B 6/4214 |
| | | | 385/79 |
| 2008/0138091 A1 | 6/2008 | Shimoguchi | |
| 2014/0193116 A1 * | 7/2014 | Bylander | G02B 6/4214 |
| | | | 385/33 |
| 2014/0193124 A1 * | 7/2014 | Bylander | G02B 6/4214 |
| | | | 385/93 |
| 2014/0270668 A1 * | 9/2014 | Mermelstein | G02B 6/4287 |
| | | | 385/123 |
| 2015/0301295 A1 * | 10/2015 | Smith | G02B 6/32 |
| | | | 385/34 |
| 2018/0259715 A1 * | 9/2018 | Toba | G02B 6/32 |
| 2019/0162909 A1 * | 5/2019 | Toba | G02B 6/327 |

* cited by examiner

OPTICAL CONNECTOR, OPTICAL CABLE, AND ELECTRONIC DEVICE

CROSS REFERENCE TO PRIOR APPLICATION

This application is a National Stage Patent Application of PCT International Patent Application No. PCT/JP2017/028145 (filed on Aug. 2, 2017) under 35 U.S.C. § 371, which claims priority to Japanese Patent Application Nos. 2016-157089 (filed on Aug. 10, 2016) and 2016-223742 (filed on Nov. 17, 2016), which are all hereby incorporated by reference in their entirety.

TECHNICAL FIELD

The present technology relates to an optical connector, an optical cable, and an electronic device. More particularly, the present technology relates to an optical connector and the like capable of avoiding a risk due to light leakage at the time of removal.

BACKGROUND ART

In recent years, with an increase in traffic volume on the Internet and the like, a larger transmission capacity is required. With the conventional transmission system via a copper cable, it is becoming difficult to achieve such a large transmission capacity. Optical communication has been therefore devised capable of achieving a larger transmission capacity.

Currently, in commonly used optical cables, a so-called physical contact (PC) method is adopted in which optical fibers face each other in a connector. However, in the PC method, highly accurate adjustment is required for alignment of both optical fibers. Furthermore, in the facing of the optical fibers, it is necessary to clean both the optical fibers each time the connection is made not to cause the optical fiber to be damaged due to adhesion of dust or the like to the tip of the optical fiber. Moreover, in the PC method, it is indispensable to inject a refractive index adjusting agent into the gap to suppress poor coupling in the gap at the tip of the optical fiber. As a result, it is difficult for general users to insert and remove optical fibers by the PC method.

As a method for solving these problems, a collimating optical coupling system has been devised. In the collimating optical coupling system, lenses are respectively mounted on the tips of the optical fibers with optical axes aligned with those of the optical fibers, and optical signals are made to be parallel lights and transmission of the optical signal is performed between the lenses facing each other. By using such a collimating optical coupling system, alignment accuracy is relaxed between the connectors of the optical fiber. Moreover, in the collimating optical coupling system, since the optical fibers are optically coupled with each other in a non-contact state, adverse effect is also suppressed on transmission quality due to dust or the like entering between the optical fibers, and frequent and careful cleaning is also unnecessary.

By the way, in principle, the parallel light used in the collimating optical coupling system is hard to attenuate even when it is away from the emitting portion, and depending on its intensity, it is difficult to satisfy the standards related to laser light, such as IEC 60825-1 and IEC 60825-2. Currently, a shutter is therefore provided in the optical connector for shielding the parallel light at the time of non-connection.

Furthermore, in Patent Document 1, an optical connector has been devised aiming for preventing a laser hazard due to collimated light (parallel light). Specifically, in an optical connector for performing collimating optical coupling, an optical connector is disclosed in which two uneven structures facing each other are provided in an optical fiber fixing portion and a collimating lens. In the optical connector, at the time of non-connection of the optical connector, the collimating lens is separated from the optical fiber fixing portion, and the uneven structure scatters light from the optical fiber. On the other hand, in the optical connector, at the time of connection of the optical connector, the collimating lens is pressed, whereby the collimating lens is in contact with the optical fiber fixing portion via the two uneven structures and emits parallel light.

CITATION LIST

Patent Document

Patent Document 1: Japanese Patent Application Laid-Open No. 2013-64803

SUMMARY OF THE INVENTION

Problems to be Solved by the Invention

In the optical connector described in Patent Document 1, even at the time of non-connection, by pushing the collimating lens, the collimating lens is brought into contact with the optical fiber fixing portion via the two uneven structures, and collimated light can be emitted from the optical connector. Furthermore, the optical connector described in Patent Document 1 has a complicated structure, such as a mechanism for bringing and separating the collimating lens close to and away from the optical fiber fixing portion.

An object of the present technology is to make it possible to prevent a laser hazard at the time of non-connection with a simple structure.

Solutions to Problems

The concept of the present technology is in
an optical connector including:
a cylindrical connector exterior; and a block that is incorporated in one end side of the connector exterior and in which a light emitting portion or a light incident portion is mounted toward another end side of the connector exterior, in which
the light emitting portion or the light incident portion is mounted on the block such that an optical axis direction of the light emitting portion or the light incident portion is inclined with respect to a longitudinal direction of the connector exterior.

In the present technology, in one end side of the cylindrical connector exterior, the block is incorporated in which the light emitting portion or the light incident portion is mounted toward the other end side of the connector exterior. The light emitting portion or the light incident portion is mounted on the block such that the optical axis direction of the light emitting portion or the light incident portion is inclined with respect to the longitudinal direction of the connector exterior. For example, the connector exterior may have the length at which at least a part of light emitted from the light emitting portion can be emitted to the inner side of the connector exterior. In this case, for example, an optical signal emitted to the inner side of the connector exterior may be diffused by a surface of the inner side, and power of light exposed outside may satisfy a safety standard.

As described above, in the present technology, a structure is made in which the optical axis direction of the light emitting portion mounted on the block is inclined with respect to the longitudinal direction of the connector exterior, and a direction of the light emitted from the light emitting portion is caused to incline with respect to the longitudinal direction of the connector exterior. Therefore, the light (laser light) emitted from the light emitting portion at the time of non-connection can be emitted to the inner side of the connector exterior, and the laser hazard at the time of non-connection can be prevented with a simple structure.

Note that, in the present technology, for example, the block may be movably provided, and a biasing portion may be further included for biasing the block toward a mating connector in a state in which the block starts contact with a block of the mating connector. In this case, for example, a locking portion may be further included that holds a fitted state against biasing force by the biasing portion when the optical connector is fitted to the mating connector. With such a configuration, a reliable connection can be implemented between the blocks at the time of fitting to the mating connector, and the fitted state can be held satisfactorily.

Effects of the Invention

According to the present technology, the laser hazard at the time of non-connection can be prevented with a simple structure. The advantageous effects described in this specification are merely examples, and the advantageous effects of the present technology are not limited to them and may include additional effects.

MODE FOR CARRYING OUT THE INVENTION

The following is a description of a mode for carrying out the invention (the mode will be hereinafter referred to as the "embodiment"). Note that, description will be made in the following order.
1. Embodiment
2. Application example
3. Modifications 1. Embodiment

[Configuration Example of Electronic Device and Optical Cable]

Figure 1:
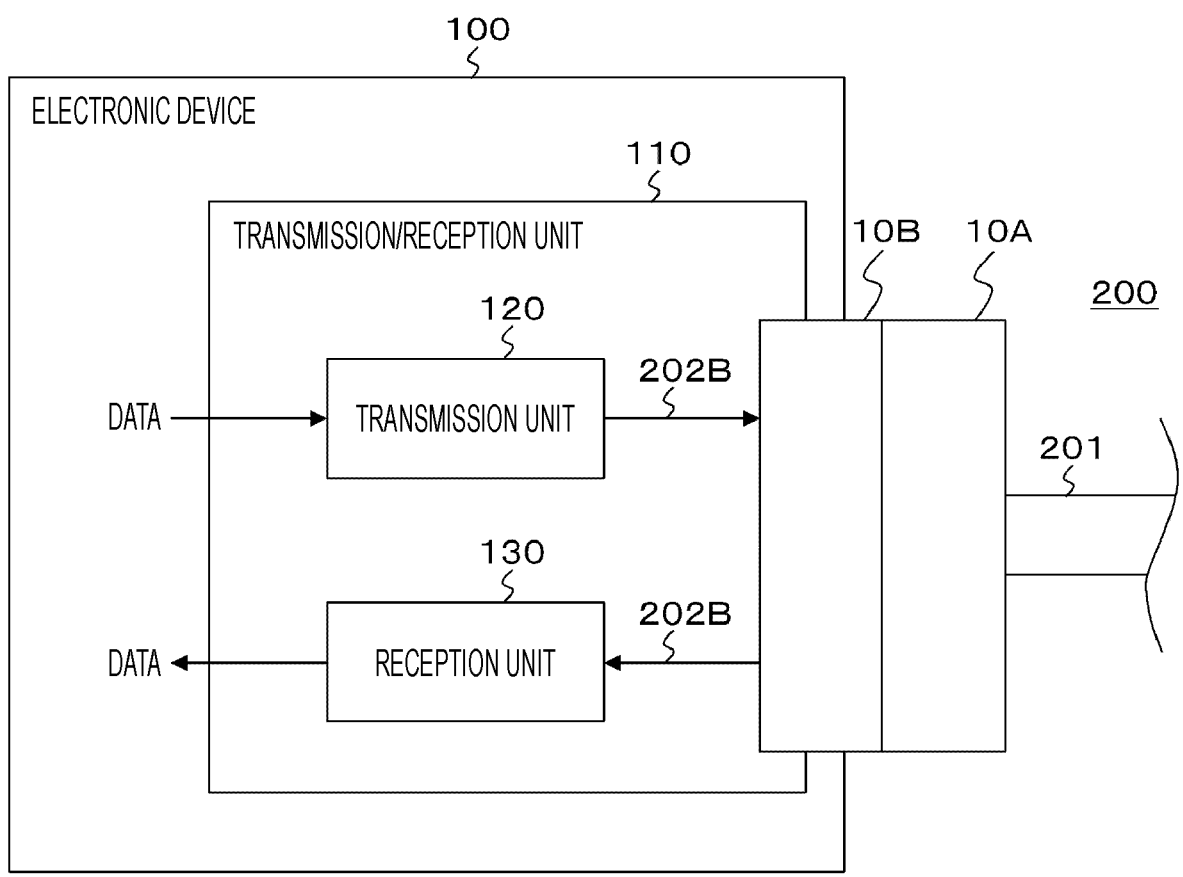
FIG. 1 is a diagram illustrating a configuration example of an electronic device and an optical cable as an embodiment.

FIG. 1 illustrates a configuration example of an electronic device 100 and an optical cable 200 as an embodiment. The electronic device 100 includes a transmission/reception unit 110. The transmission/reception unit 110 includes a transmission unit 120 and a reception unit 130, and is configured to be capable of communication. Furthermore, the transmission/reception unit 110 includes an optical connector 10B as a receptacle. By the optical connector 10B, the transmission/reception unit 110 transmits transmission data as an optical signal, and receives reception data as an optical signal.

The optical cable 200 includes an optical cable body 201 and an optical connector 10A as a plug. The optical cable 200 transmits an optical signal between the electronic device 100 and another electronic device or a communications network such as the Internet.

Note that, the electronic device 100 can be, for example, a mobile electronic device such as a mobile phone, a smartphone, a PHS, a PDA, a tablet PC, a laptop computer, a video camera, an IC recorder, a portable media player, an electronic organizer, an electronic dictionary, a calculator, or a portable game machine, and may be another electronic device such as a desktop computer, a display device, a television receiver, a radio receiver, a video recorder, a printer, a car navigation system, a game machine, a router, a hub, or an optical network unit (ONU). Alternatively, the electronic device 100 can configure a part or whole of an electric appliance such as a refrigerator, a washing machine, a clock, an interphone, air conditioning equipment, a humidifier, an air purifier, a lighting fixture, or cookware, or a vehicle as described later.

"Configuration Example of Optical Connector Functioning as Plug or Receptacle"

In the optical connector, there are an optical connector functioning as a plug and an optical connector functioning as a receptacle. By fitting both optical connectors to each other, optical communication is implemented. Although both the optical connector functioning as the plug and the optical connector functioning as the receptacle are described here, it is obvious that they function in the same way even if they are reversed, so the explanation is made with only one combination.

Figure 2:
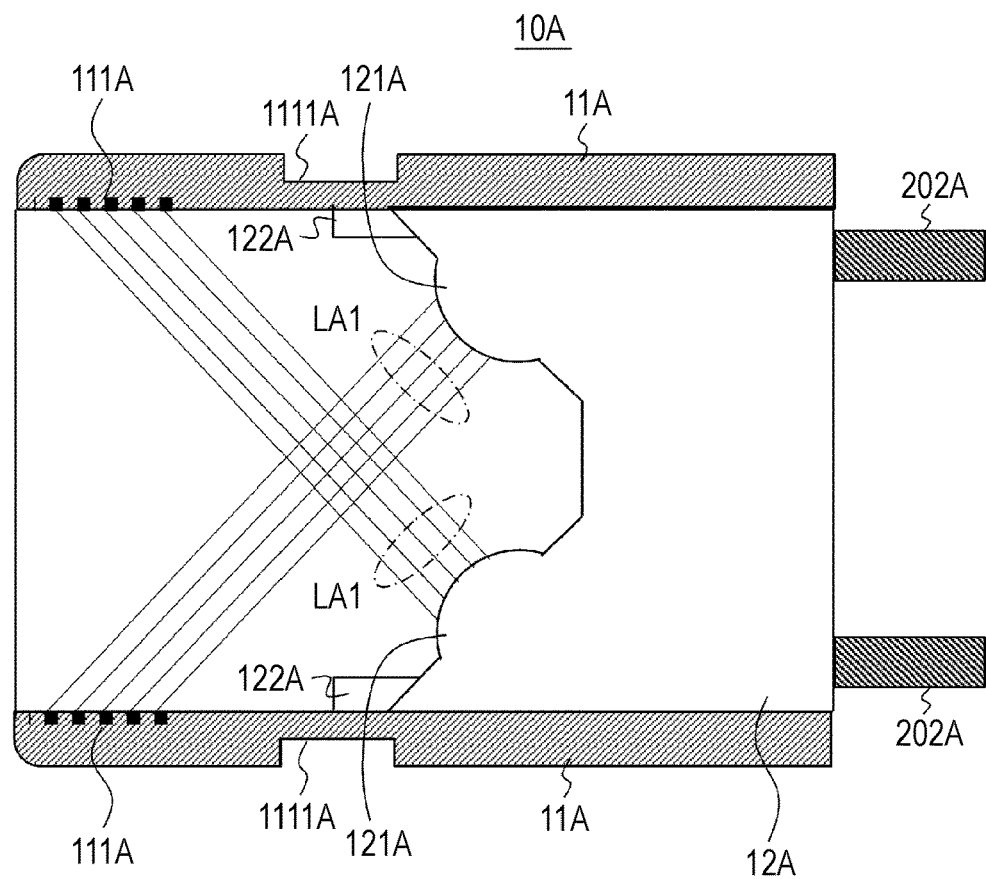
FIG. 2 is a cross-sectional view illustrating a configuration example of an optical connector functioning as a plug.

FIG. 2 illustrates a configuration example of the optical connector 10A. The optical connector 10A functions as a plug provided at an end of the optical cable body 201. The optical connector 10A includes a cylindrical connector exterior 11A and a block 12A on which a lens 121A is mounted.

The block 12A is incorporated in one end side of the connector exterior 11A. The lens 121A is mounted toward the other end side of the connector exterior 11A. The lens 121A is mounted on the block 12A in a state in which the optical axis direction is inclined to the center direction of the connector exterior 11A to be inclined with respect to the longitudinal direction of the connector exterior 11A. The lens 121A configures a light emitting portion in a case where an optical signal is transmitted, and on the other hand, the lens 121A configures a light incident portion in a case where an optical signal is received.

Note that, although two lenses 121A are illustrated in the figure, the present invention is not limited to the illustrated aspect, and any number of lenses 121A of equal to or greater than one may be mounted on the block 12A depending on the number of optical transmission lines 202A. For example, a lens array in which lenses are arrayed in the thickness direction (vertical direction in the figure) and width direction (depth direction in the figure) of the optical connector 10A may be mounted on the block 12A.

In a case where the lens 121A configures the light emitting portion, the lens 121A collimates light (laser light) output from the optical transmission line 202A and emits the light. In this case, the block 12A includes a light direction changing member that changes a direction of the light output from the optical transmission line 202A extending in the longitudinal direction of the connector exterior 11A to the optical axis direction of the lens 121A.

Furthermore, in a case where the lens 121A configures the light incident portion, the lens 121A converges incident collimated light (laser light) and inputs the light to the optical transmission line 202A. In this case, the block 12A includes a light direction changing member that changes a direction of the light converged by the lens 121A to a direction of the optical transmission line 202A extending in the longitudinal direction of the connector exterior 11A. The light direction changing member can include, for example, an optical waveguide, a mirror structure, or the like.

Figure 3:
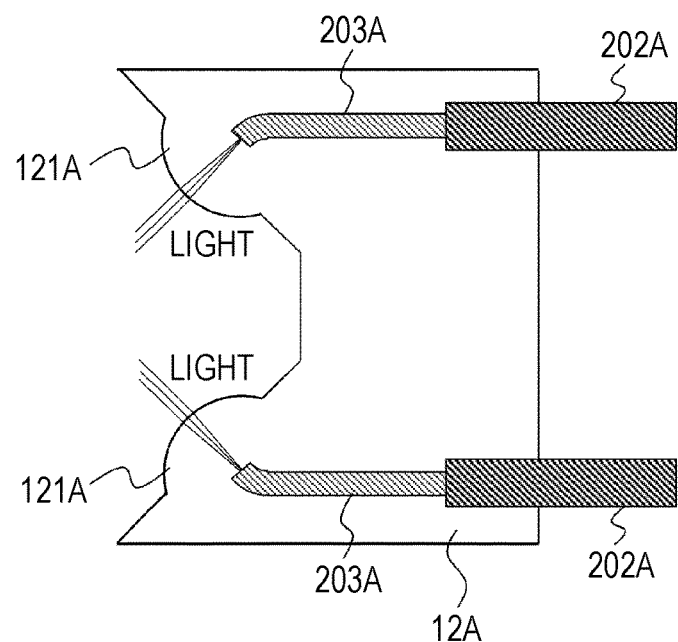
FIG. 3 is a diagram illustrating a case where a light direction changing member includes an optical waveguide.

FIG. 3 illustrates a case where the light direction changing member includes an optical waveguide 203A. In this case, regarding the light output from the optical transmission line 202A, its direction is changed to the optical axis direction of the lens 121A by the optical waveguide 203A, and the light is collimated by the lens 121A and emitted. On the other hand, regarding the collimated light incident on the lens 121A, the light is converged by the lens 121A, and a direction of the light is changed to the direction of the optical transmission line 202A extending in the longitudinal direction of the connector exterior 11A by the optical waveguide 203A, and the light is input to the transmission line 202A.

Figure 4:
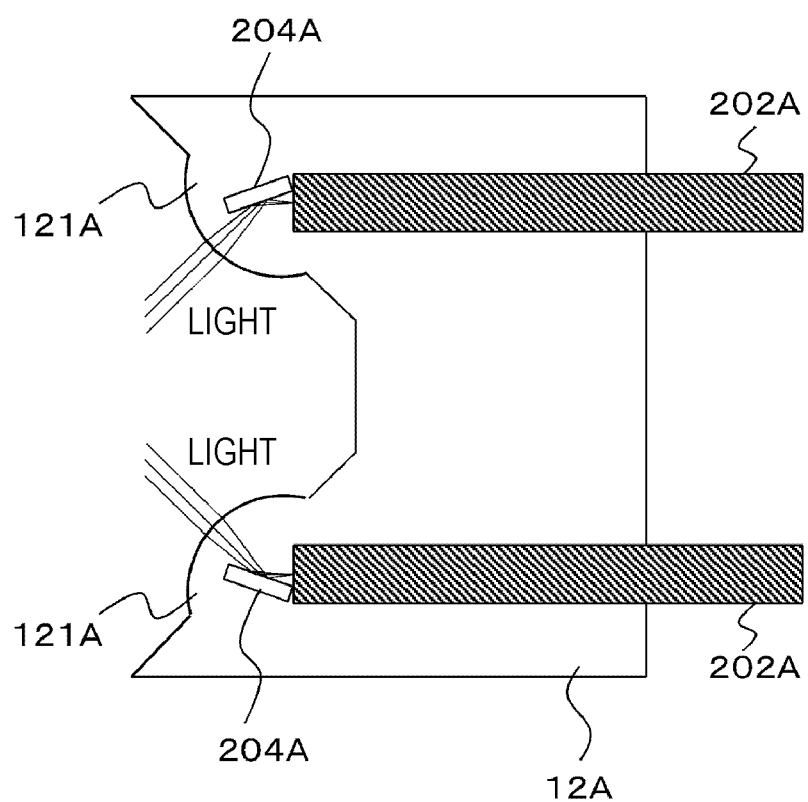
FIG. 4 is a diagram illustrating a case where the light direction changing member includes a mirror structure.

Furthermore, FIG. 4 illustrates a case where the light direction changing member includes a mirror structure 204A. In this case, regarding the light output from the optical transmission line 202A, its direction is changed to the optical axis direction of the lens 121A by the mirror structure 204A, and the light is collimated by the lens 121A and emitted. On the other hand, regarding the collimated light incident on the lens 121A, the light is converged by the lens 121A, and a direction of the light is changed to the direction of the optical transmission line 202A extending in the longitudinal direction of the connector exterior 11A by the mirror structure 204A, and the light is input to the transmission line 202A. Note that, in the example illustrated in the figure, the mirror structure 204A is illustrated to implement specular reflection, but it is not limited thereto, and, for example, it may be a reflective structure in a form of a concave mirror.

Referring back to FIG. 2, the connector exterior 11A has a length at which at least a part of collimated light (laser light) LA1 emitted from the lens 121A configuring the emitting portion can be emitted to the inner side. In other words, in this case, at least a part of the collimated light LA1 emitted from the lens 121A is emitted to the inner side (inner wall) of the connector exterior 11A and diffused. In the example illustrated in the figure, an example is illustrated in which all is emitted. This prevents a laser hazard at the time of removal. That is, power of an optical signal exposed from the optical connector 10A is sufficiently weakened to satisfy a safety standard.

A light diffusing portion 111A is formed in a portion to which the collimated light can be emitted of the connector exterior 11A. The light diffusing portion 111A is not particularly limited as long as it diffuses light, and may be, for example, a rough surface or a porous film such as an anodized aluminum layer. The anodized aluminum layer can be formed easily and inexpensively, and is excellent in light diffusibility. In a case where the light diffusing portion 111A is an anodized aluminum layer, the connector exterior 11A includes aluminum.

Furthermore, a holding portion 122A for contacting a block of a mating connector is provided on the lens 121A side of the block 12A. The holding portion 122A makes it possible to hold connection of both blocks to a holding portion similarly provided on the block of the mating connector at a specific distance.

Moreover, the connector exterior 11A is provided with a locking groove 1111A for storing a locking spring to hold fitting to the mating connector (optical connector functioning as the receptacle). The locking groove 1111A allows holding at a specific position at the time of fitting. The mechanism of the locking groove 1111A and the locking spring is set to a locking strength to an extent that it is released by a certain degree of removal force.

Figure 5:
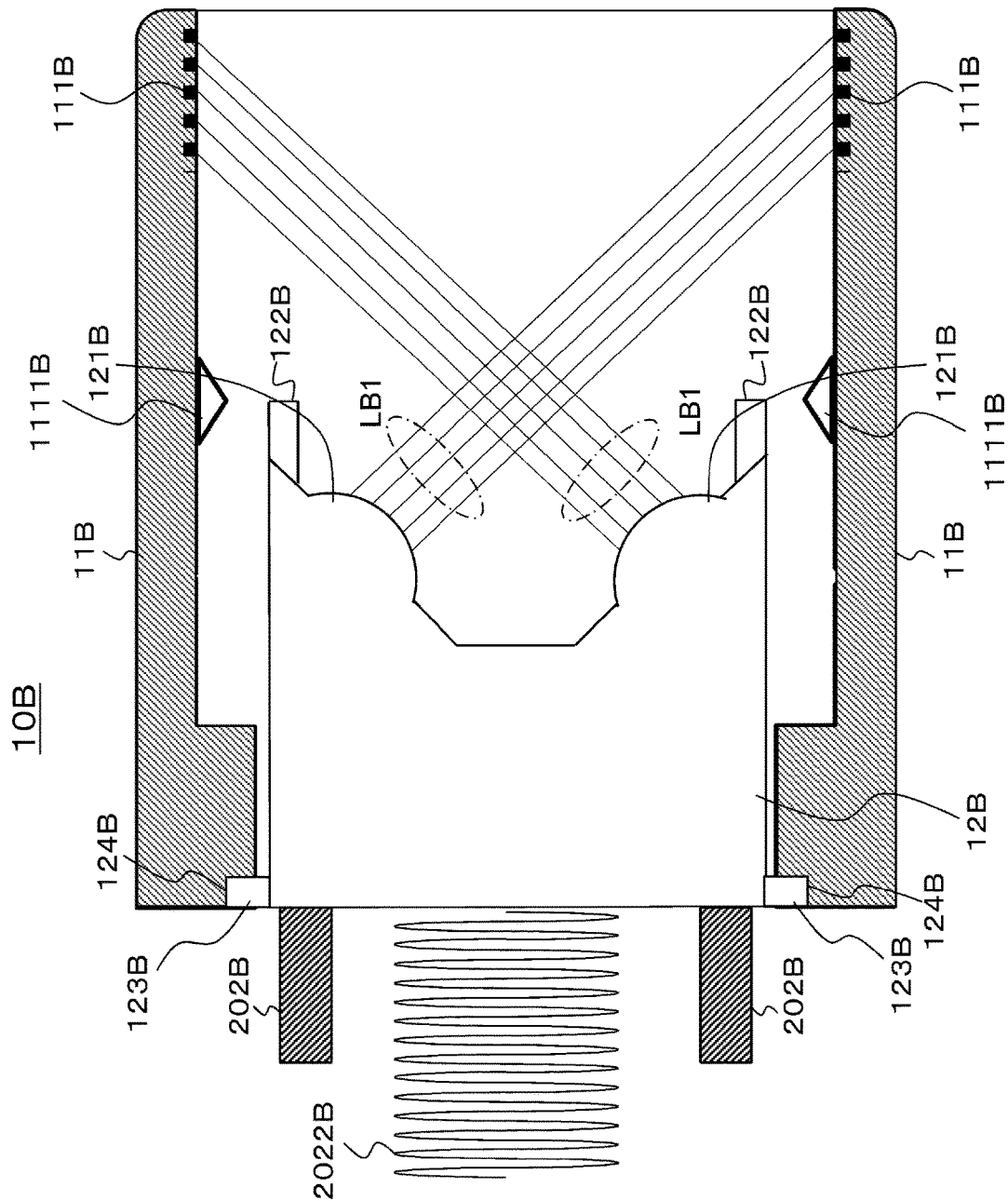
FIG. 5 is a cross-sectional view illustrating a configuration example of an optical connector functioning as a receptacle.

FIG. 5 illustrates a configuration example of the optical connector 10B. The optical connector 10B functions as a receptacle provided to a housing of the electronic device 100. The optical connector 10B includes a cylindrical connector exterior 11B and a block 12B on which a lens 121B is mounted.

The block 12B is incorporated in one end side of the connector exterior 11B. The lens 121B is mounted toward the other end side of the connector exterior 11B. The lens 121B is mounted on the block 12B in a state in which the optical axis direction is inclined to the center direction of the connector exterior 11B to be inclined with respect to the longitudinal direction of the connector exterior 11B. The lens 121B configures a light emitting portion in a case where an optical signal is transmitted, and on the other hand, the lens 121B configures a light incident portion in a case where an optical signal is received.

Note that, although two lenses 121B are illustrated in the figure, the present invention is not limited to the illustrated aspect, and any number of lenses 121B of equal to or greater than one may be mounted on the block 12B depending on the number of optical transmission lines 202B. For example, a lens array in which lenses are arrayed in the thickness direction (vertical direction in the figure) and width direction (depth direction in the figure) of the optical connector 10B may be mounted on the block 12B.

In a case where the lens 121B configures the light emitting portion, the lens 121B collimates light (laser light) output from the optical transmission line 202B and emits the light. In this case, the block 12B includes a light direction changing member that changes a direction of the light output from the optical transmission line 202B extending in the longitudinal direction of the connector exterior 11B to the optical axis direction of the lens 121B.

Furthermore, in a case where the lens 121B configures the light incident portion, the lens 121B converges incident collimated light (laser light) and inputs the light to the optical transmission line 202B. In this case, the block 12B includes a light direction changing member that changes a direction of the light converged by the lens 121B to a direction of the optical transmission line 202B extending in the longitudinal direction of the connector exterior 11B.

Although detailed description is omitted, the light direction changing member includes an optical waveguide or a mirror structure (see FIGS. 3 and 4) similarly to the above-described optical connector 10A.

The connector exterior 11B has a length at which at least a part of collimated light (laser light) LB1 emitted from the lens 121B configuring the emitting portion can be emitted to the inner side (inner wall). In other words, in this case, at least a part of the collimated light emitted from the lens 121B is emitted to the inner side (inner wall) of the connector exterior 11B and diffused. In the example illustrated in the figure, an example is illustrated in which all is emitted. This prevents a laser hazard at the time of removal. That is, power of an optical signal exposed from the optical connector 10A is sufficiently weakened to satisfy a safety standard.

A light diffusing portion 111B is formed in a portion to which the collimated light can be emitted of the connector exterior 11B. The light diffusing portion 111B is not particularly limited as long as it diffuses light, and may be, for example, a rough surface or a porous film such as an anodized aluminum layer. The anodized aluminum layer can be formed easily and inexpensively, and is excellent in light diffusibility. In a case where the light diffusing portion 111B is an anodized aluminum layer, the connector exterior 11B includes aluminum.

Furthermore, a holding portion 122B for contacting a block of a mating connector is provided on the lens 121B side of the block 12B. The holding portion 122B makes it possible to hold connection of both blocks to a holding portion similarly provided on the block of the mating connector at a specific distance.

Moreover, the connector exterior 11B is provided with a locking spring 1111B to be stored in the locking groove to hold fitting to the mating connector (optical connector functioning as the plug). The locking spring 1111B allows holding at a specific position against biasing force of the spring as described later at the time of fitting. The mechanism (locking mechanism) of the locking spring 1111B and the locking groove is set to a locking strength to an extent that it is released by a certain degree of removal force.

Furthermore, the block 12B is installed in a state (floating state) in which the block 12B is movable in the longitudinal direction inside the connector exterior 11B, and the block 12B is biased in a direction of the open end by a spring 2022B. In this case, the block portion 12B is biased to the mating connector side in a state in which the block portion 12B starts contact with the block of the mating connector. This makes it possible to keep the contact with the block of the mating connector satisfactorily even in a situation such as prying or insufficient insertion, at the time of fitting. Note that, a regulating projection 123B provided in the block 12B is in contact with a regulating recess 124B of the connector exterior 11B, whereby the movement of the block 12B in the direction of the open end is regulated.

Figure 6:
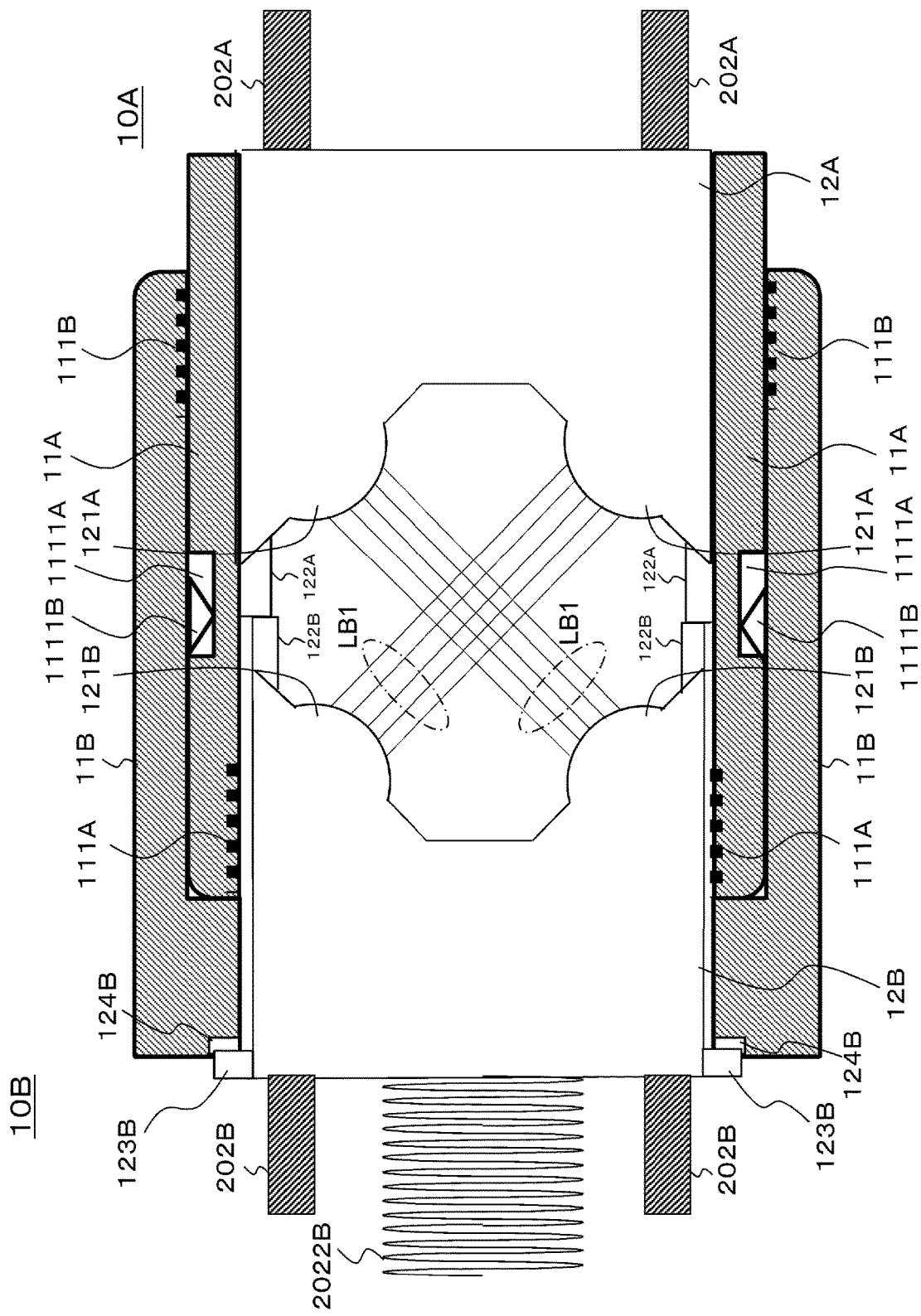
FIG. 6 is a diagram illustrating a state in which the optical connector functioning as the plug and the optical connector functioning as the receptacle are connected together.

FIG. 6 illustrates a state in which the optical connector 10B and the optical connector 10A are fitted to each other, that is, a state in which the optical connector 10A is inserted into the optical connector 10B and the optical connectors 10A and 10B are connected together. The fixed block 12A of the optical connector 10A and the block 12B of the optical connector 12B that is biased by the spring 2022B in a movable state are connected together by holding portions 122A and 122B, and fixed in a state in which communication is possible between the lens 121A and the lens 121B in a state in which both optical signals are inclined to each other.

In the illustrated example, the lens 121B of the optical connector 10B configures the light emitting portion, and the lens 121A of the optical connector 10A configures the light incident portion, for example. The collimated light LB1 emitted from the lens 121B mounted on the lower part in the figure of the optical connector 10B is incident on the lens 121A mounted on the upper part in the figure of the optical connector 10A. Furthermore, the collimated light LB1 emitted from the lens 121B mounted on the upper part in the figure of the optical connector 10B is incident on the lens 121A mounted on the lower part in the figure of the optical connector 10A.

Note that, an example is similarly conceivable in which the lens 121A of the optical connector 10A configures the light emitting portion and the lens 121B of the optical connector 10B configures the light incident portion. Furthermore, an example is similarly conceivable in which part of a plurality of the lenses 121A of the optical connector 10A configures the light emitting portion and the rest of the part configures a light incident portion, and correspondingly part of a plurality of the lenses 121B of the optical connector 10B configures the light incident portion and the rest of the part configures the light emitting portion.

Furthermore, the locking spring 1111B of the optical connector 10B is fitted to the locking groove 1111A of the optical connector 10A, and the optical connector 10A and the optical connector 10B are fixed at a fitting distance in a state in which communication is possible. This fitting is easy to disengage by removal with a certain degree of strength.

As described above, in the optical connectors 10A and 10B illustrated in FIGS. 2 and 5, at least a part of the collimated light (laser light) emitted from the lenses 121A and 121B as the light emitting portions at the time of non-connection is emitted to the light diffusing portions 111A and 111B on the inner sides of the connector exteriors 11A and 11B and diffused. Therefore, the light intensity sufficiently lowers at a distance defined by a safety criteria, and satisfies a safety standard. That is, the optical connectors 10A and 10B can prevent the laser hazard at the time of non-connection (at the time of removal) with a simple structure.

Furthermore, the block 12B of the optical connector 10B illustrated in FIG. 5 is movably provided, and in a state in which the optical connector 10A illustrated in FIG. 2 is inserted into the optical connector 10B and the block 12B starts contact with the block 12A, the block 12B is biased toward the optical connector 10A side by the spring 2022B.

Then, furthermore, in a state in which the optical connectors 10A and 10B illustrated in FIGS. 2 and 5 are fitted to each other, the locking spring 1111B of the optical connector 10B is fitted to the locking groove 1111A of the optical connector 10A, and a fitted state of the optical connector 10A and the optical connector 10B is held against the biasing force by the spring 2022B. Therefore, reliable connection of the blocks can be implemented at the time of fitting of the optical connector 10A and the optical connector 10B, and also the fitted state can be held satisfactorily.

"Configuration Example of Electronic Device"

A configuration example of the electronic device 100 will be described. As illustrated in FIG. 1, the electronic device 100 includes the transmission/reception unit 110. The transmission/reception unit 110 includes the transmission unit 120 that transmits an optical signal, the reception unit 130 that receives an optical signal, and the optical connector 10B.

The transmission unit 120 converts transmission data from an electrical signal to an optical signal, and transmits the optical signal to the optical connector 10B via the optical transmission line 202B. Furthermore, the reception unit 130 converts an optical signal transmitted from the optical connector 10B via the optical transmission line 202B into an electrical signal to obtain reception data.

Figure 7:
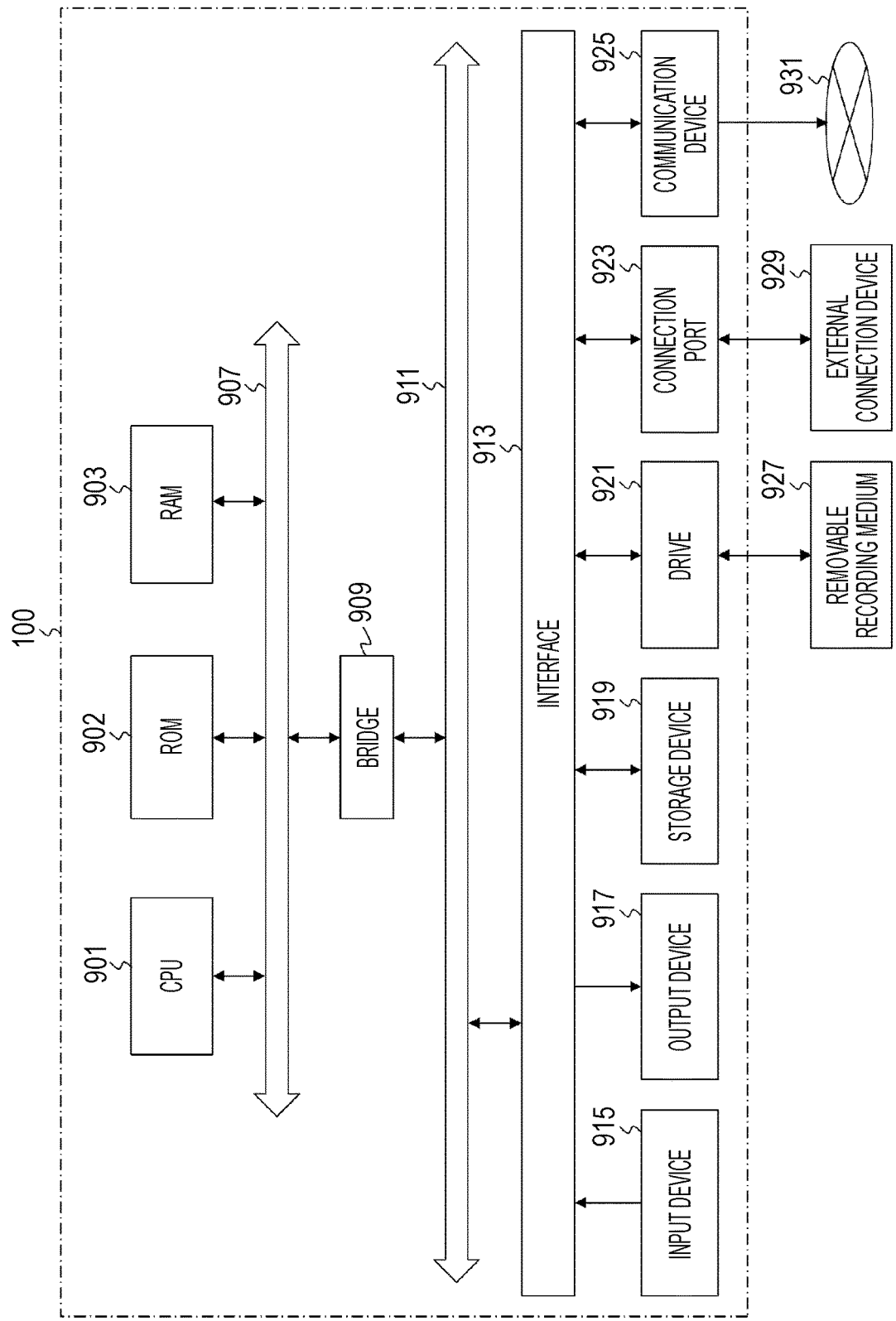
FIG. 7 is a block diagram illustrating an example of a hardware configuration of the electronic device.

FIG. 7 illustrates an example of a hardware configuration of the electronic device 100. Note that, it is a matter of course that the hardware configuration of the electronic device 100 is not limited thereto.

The electronic device 100 mainly includes a CPU 901, ROM 902, and RAM 903. Furthermore, the electronic device 100 further includes a host bus 907, a bridge 909, an external bus 911, an interface 913, an input device 915, an output device 917, a storage device 919, a drive 921, a connection port 923, and a communication device 925.

The CPU 901 functions as an arithmetic processing device and a control device, and controls overall operation in the electronic device 100 or a part thereof in accordance with various programs recorded in the ROM 902, the RAM 903, the storage device 919, or a removable recording medium 927. The ROM 902 stores programs to be used by the CPU 901, calculation parameters, and the like. The RAM 903 temporarily stores programs to be used by the CPU 901, parameters that change as appropriate in the execution of the programs, and the like. These are connected to each other by the host bus 907 including an internal bus such as a CPU bus.

The host bus 907 is connected to the external bus 911 such as a peripheral component interconnect/interface (PCI) bus via the bridge 909.

The input device 915 is an operation means operated by a user, for example, a mouse, a keyboard, a touch panel, a button, a switch, a lever, or the like. Furthermore, the input device 915 may be, for example, a remote control means (so-called remote controller) using infrared rays or other radio waves, or an external connection device 929 such as a mobile phone or a PDA adaptable to the operation of the electronic device 100. Moreover, the input device 915 includes, for example, an input control circuit that generates an input signal on the basis of information input by the user using the above operation means and outputs the signal to the CPU 901, and the like. By operating the input device 915, the user of the electronic device 100 can input various data to the electronic device 100 and give an instruction to perform processing operation.

The output device 917 includes a device that can visually or aurally notify the user of acquired information. Examples of the device include: a display device such as a CRT display device, a liquid crystal display device, a plasma display device, an EL display device, or a lamp; an audio output device such as a speaker or a headphone; a printer device; a mobile phone; a facsimile; and the like. The output device 917 outputs, for example, a result obtained by various types of processing performed by the electronic device 100. Specifically, the display device displays the result obtained by the various types of processing performed by the electronic device 100 as a text or an image. On the other hand, the audio output device converts an audio signal including reproduced audio data, acoustic data, and the like into an analog signal to output the signal.

The storage device 919 is a device for storing data configured as an example of a storage unit of the electronic device 100. The storage device 919 includes, for example, a magnetic storage device such as a hard disk drive (HDD), a semiconductor storage device, an optical storage device, a magneto-optical storage device, or the like. The storage device 919 stores various data and programs executed by the CPU 901, various data acquired from the outside, and the like.

The drive 921 is a reader/writer for a recording medium, and is incorporated in the electronic device 100 or externally attached thereto. The drive 921 reads information recorded on the removable recording medium 927 such as a mounted magnetic disk, optical disk, magneto-optical disk, or semiconductor memory, and outputs the information to the RAM 903. Furthermore, the drive 921 can also write a record onto the removable recording medium 927 such as a mounted magnetic disk, optical disk, magneto-optical disk, or semiconductor memory.

The removable recording medium 927 is, for example, a DVD medium, an HD-DVD medium, a Blu-ray medium, or the like. Furthermore, the removable recording medium 927 may be a CompactFlash (registered trademark) (CF), a flash memory, an SD memory card (Secure Digital memory card), or the like. Furthermore, the removable recording medium 927 may be, for example, an integrated circuit card (IC card) mounting a non-contact type IC chip, an electronic device, or the like.

The connection port 923 is a port for directly connecting a device to the electronic device 100. As an example of the connection port 923, there are a universal serial bus (USB) port, an IEEE 1394 port, a small computer system interface (SCSI) port, and the like. As another example of the connection port 923, there are an RS-232C port, an optical digital terminal, a high-definition multimedia interface (HDMI) port, and the like. By connecting the external connection device 929 to the connection port 923, the electronic device 100 directly acquires various data from the external connection device 929, or provides various data to the external connection device 929. Note that, the optical digital terminal may be configured as the optical transmission/reception unit 110 including the optical communication connector 10B described above.

The communication device 925 is, for example, a communication interface including a communication device or the like for connecting to the communications network 931. In the present embodiment, the communication device 925 includes the optical transmission/reception unit 110 including the optical communication connector 10B described above. The communication device 925 may be a router for optical communication. Furthermore, the communication device 925 may further include, for example, a communication card for a wired or wireless local area network (LAN), Bluetooth (registered trademark), Wireless USB (WUSB), or the like.

Furthermore, the communication device 925 may include a router for an asymmetric digital subscriber line (DSL), a modem for various types of communication, or the like. The communication device 925 can transmit and receive signals and the like to and from, for example, the Internet and other communication devices in accordance with a predetermined protocol, for example, FTTx such as FTTR, FTTB, FTTH, or FTTD, TCP/IP, or the like. Furthermore, the communications network 931 connected to the communication device 925 includes a network or the like connected by wire or wirelessly, and may be, for example, the Internet, a home LAN, infrared communication, radio wave communication, satellite communication, or the like.

"Configuration Example of Optical Cable"

A configuration example of the optical cable 200 will be described. As illustrated in FIG. 1, the optical cable 200 includes the optical cable body 201 and the optical connector 10A. The cable body 201 includes an optical transmission line 202A (see FIG. 2) inside. The optical transmission line 202A is, for example, an optical fiber. Note that, the optical transmission line 202A is not particularly limited as long as it can transmit light, and it may be other than the optical fiber. The outer circumferential surface of the optical transmission line 202A is appropriately covered. Furthermore, the optical connector 10A is connected to the tip side of the optical transmission line 202A.

The optical cable 200 as described above can be used for connection for optical communication between an electronic device such as the electronic device 100 as described above and another device.

"Another Configuration Example of Optical Connector Functioning as Plug or Receptacle"

Next, another configuration example will be described of the optical connector functioning as a plug or a receptacle. Note that, in this configuration example, illustration and description are omitted of a biasing mechanism, a locking mechanism, and a block spacing holding mechanism. This also applies to other configuration examples below.

Figure 8:
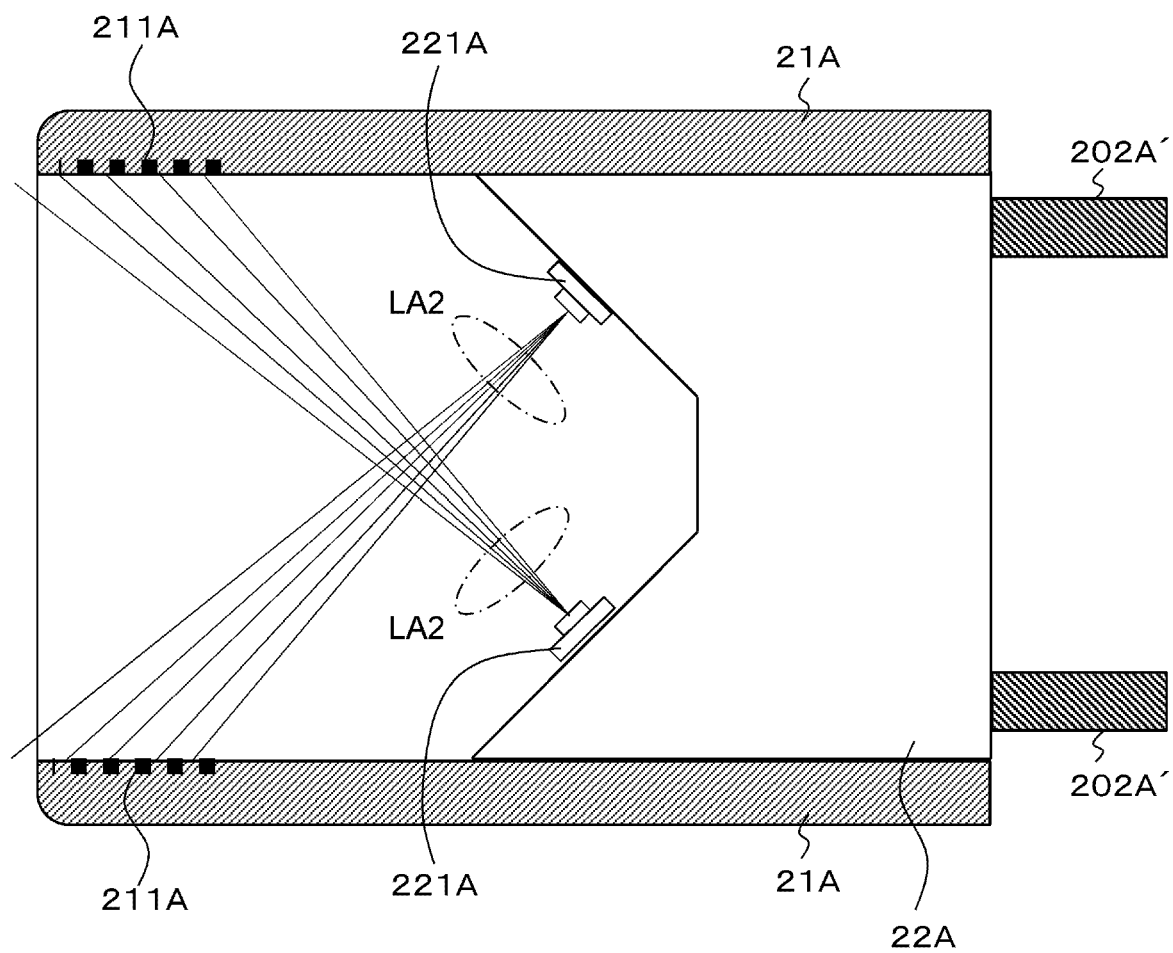
FIG. 8 is a cross-sectional view illustrating a configuration example of an optical connector functioning as a plug.

FIG. 8 illustrates a configuration example of an optical connector 20A. Similarly to the optical connector 10A described above, the optical connector 20A functions as a plug provided at the end of the optical cable body 201. The optical connector 20A includes a cylindrical connector exterior 21A and a block 22A on which an optical element 221A is mounted.

The block 22A is incorporated in one end side of the connector exterior 21A. The optical element 221A is mounted toward the other end side of the connector exterior 21A. The optical element 221A is mounted on the block 22A in a state in which the optical axis direction is inclined to the center direction of the connector exterior 21A to incline with respect to the longitudinal direction of the connector exterior 21A.

Note that, although two optical elements 221A are illustrated in the figure, the present invention is not limited to the illustrated aspect, and any number of optical elements 221A of equal to or greater than one may be mounted on the block 22A depending on the number of electrical transmission lines 202A'. For example, an optical element array in which optical elements are arrayed in the thickness direction (vertical direction in the figure) and width direction (depth direction in the figure) of the optical connector 20A may be mounted on the block 22A. Note that, the electrical transmission line 202A' is replaced with the optical transmission line 202A described above.

The optical element 221A is a light emitting element configuring a light emitting portion in a case where an optical signal is transmitted, and converts an electrical signal transmitted through the electrical transmission line 202A' into an optical signal (laser light) to emit the optical signal. On the other hand, the optical element 221A is a light receiving element configuring a light incident portion in a case where an optical signal is received, and converts an incident optical signal (laser light) into an electrical signal to transmit the signal to the electrical transmission line 202A'.

The connector exterior 21A has a length at which at least a part of light (laser light) LA2 emitted from the optical element 221A configuring the light emitting portion can be emitted to the inner side (inner wall). In other words, in this case, at least a part of the light LA2 emitted from the optical element 221A is emitted to the inner side (inner wall) of the connector exterior 21A and diffused. In the example illustrated in the figure, an example is illustrated in which a part is emitted. This prevents a laser hazard at the time of removal.

A light diffusing portion 211A is formed in a portion to which the laser light can be emitted of the connector exterior 21A. The light diffusing portion 211A is not particularly limited as long as it diffuses light, and may be, for example, a rough surface or a porous film such as an anodized aluminum layer. The anodized aluminum layer can be formed easily and inexpensively, and is excellent in light diffusibility. In a case where the light diffusing portion 211A is an anodized aluminum layer, the connector exterior 21A includes aluminum.

Figure 9:
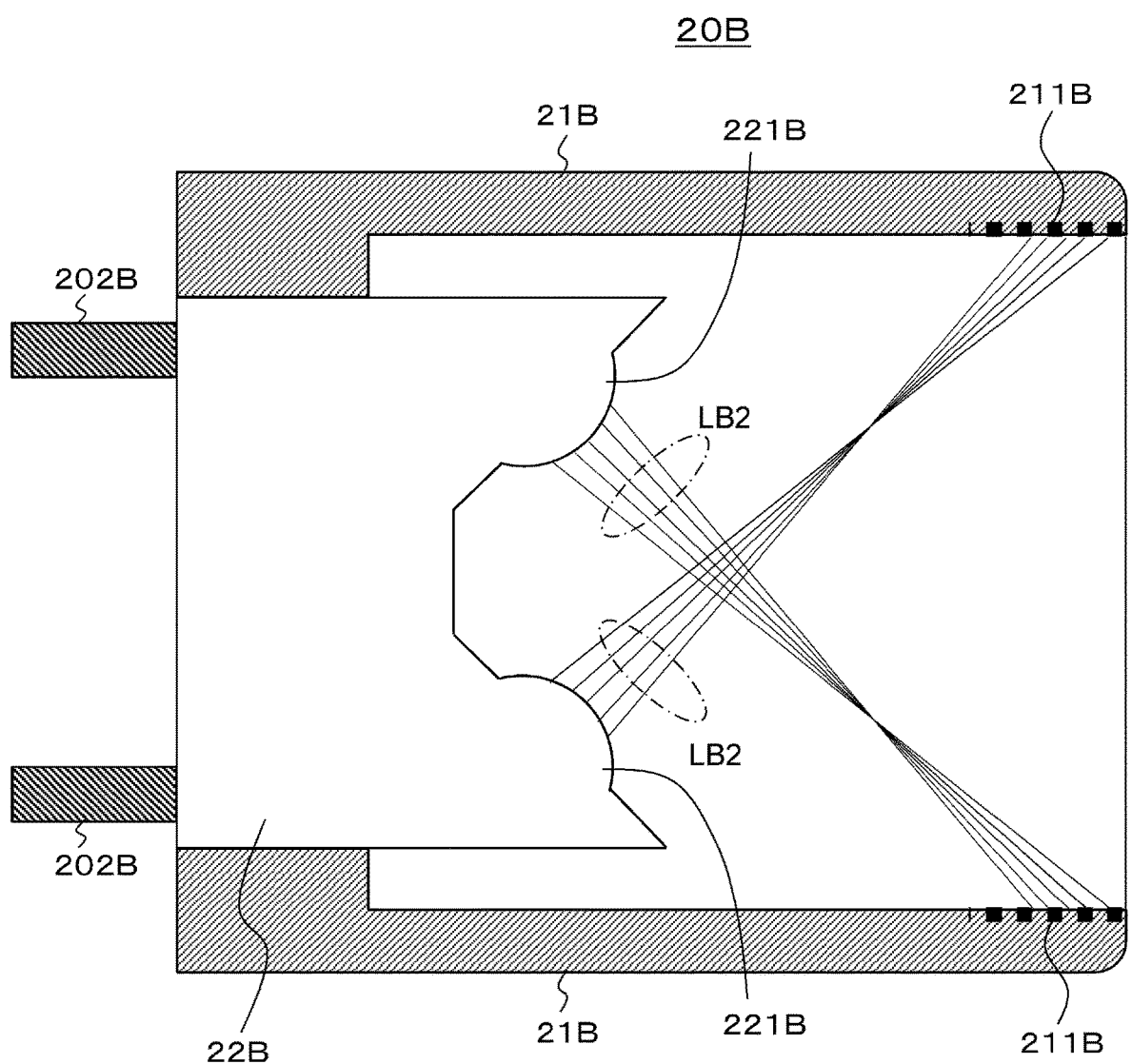
FIG. 9 is a cross-sectional view illustrating a configuration example of an optical connector functioning as a receptacle.

FIG. 9 illustrates a configuration example of an optical connector 20B. Similarly to the optical connector 10B described above, the optical connector 20B functions as a receptacle provided to the housing of the electronic device 100. The optical connector 20B includes a cylindrical connector exterior 21B and a block 22B on which a lens 221B is mounted. The block 22B is incorporated in one end side of the connector exterior 21B.

The lens 221B is mounted toward the other end side of the connector exterior 21B. The lens 221B is mounted on the block 22B in a state in which the optical axis direction is inclined to the center direction of the connector exterior 21B to be inclined with respect to the longitudinal direction of the connector exterior 21B. The lens 221B configures a light emitting portion in a case where an optical signal is transmitted, and on the other hand, the lens 221B configures a light incident portion in a case where an optical signal is received.

Note that, although two lenses 221B are illustrated in the figure, the present invention is not limited to the illustrated aspect, and any number of lenses 221B of equal to or greater than one may be mounted on the block 22B depending on the number of the optical transmission lines 202B. For example, a lens array in which lenses are arrayed in the thickness direction (vertical direction in the figure) and width direction (depth direction in the figure) of the optical connector 20B may be mounted on the block 22B.

In a case where the lens 221B configures the light emitting portion, the lens 221B emits light (laser light) output from the optical transmission line 202B to converge the light. In this case, the block 22B includes a light direction changing member that changes a direction of the light output from the optical transmission line 202B extending in the longitudinal direction of the connector exterior 21B to the optical axis direction of the lens 221B.

Furthermore, in a case where the lens 221B configures the light incident portion, the lens 221B refracts incident light (laser light) to converge the light and input the light to the optical transmission line 202B. In this case, the block 12B includes a light direction changing member that changes a direction of the light converged by the lens 221B to a direction of the optical transmission line 202B extending in the longitudinal direction of the connector exterior 21B.

Although detailed description is omitted, the light direction changing member includes an optical waveguide or a mirror structure or the like (see FIGS. 3 and 4).

The connector exterior 21B has a length at which at least a part of light (laser light) LB2 emitted from the lens 221B configuring the emitting portion can be emitted to the inner side (inner wall). In other words, in this case, at least a part of the light LB2 emitted from the lens 221B is emitted to the inner side (inner wall) of the connector exterior 21B and diffused. In the example illustrated in the figure, an example is illustrated in which all is emitted. This prevents a laser hazard.

A light diffusing portion 211B is formed in a portion to which the emitted light can be emitted of the connector exterior 21B. The light diffusing portion 211B is not particularly limited as long as it diffuses light, and may be, for example, a rough surface or a porous film such as an anodized aluminum layer. The anodized aluminum layer can be formed easily and inexpensively, and is excellent in light diffusibility. In a case where the light diffusing portion 211B is an anodized aluminum layer, the connector exterior 21B includes aluminum.

Figure 10:
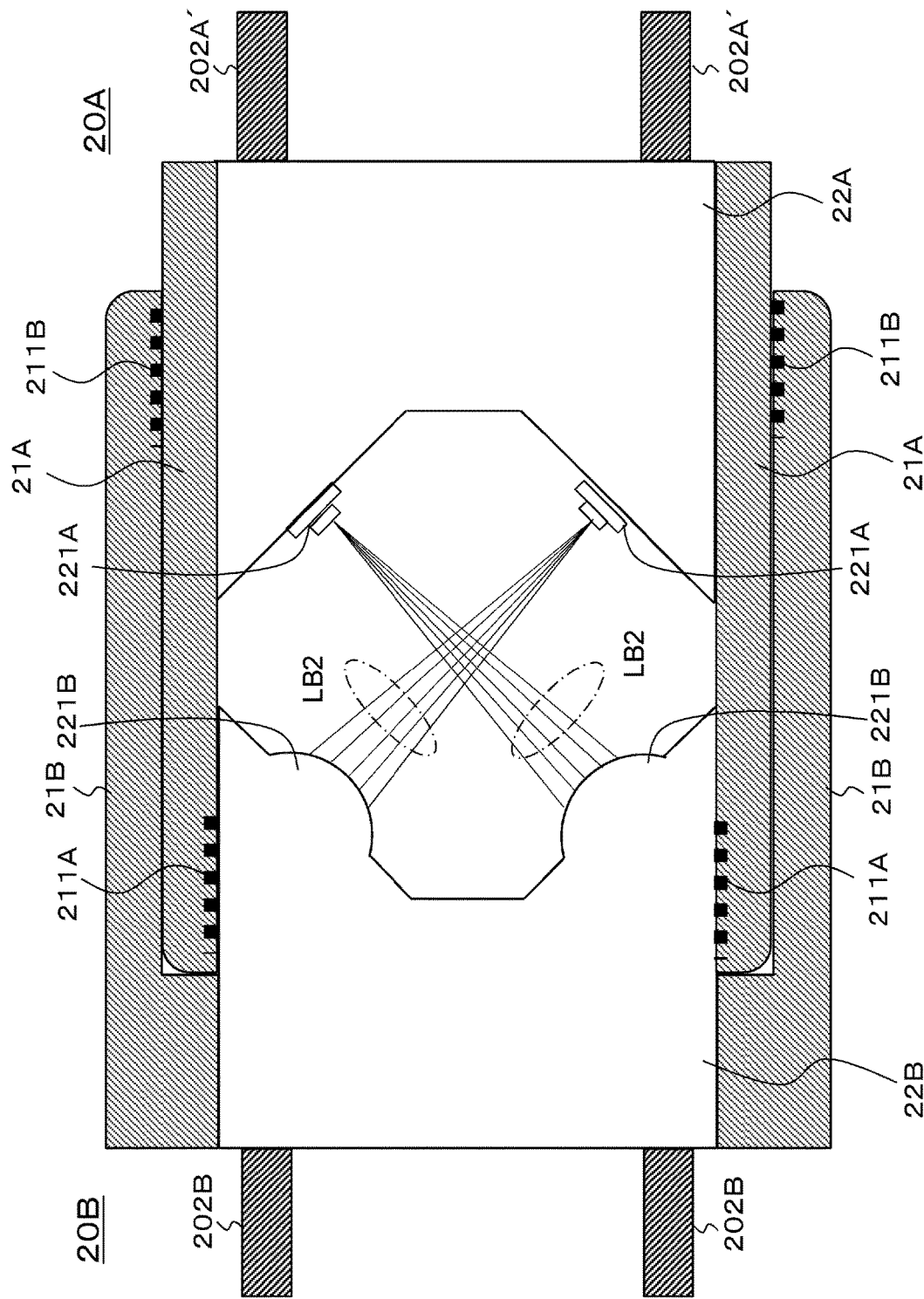
FIG. 10 is a diagram illustrating a state in which the optical connector functioning as the plug and the optical connector functioning as the receptacle are connected together.

FIG. 10 illustrates a state in which the optical connector 20A is inserted into the optical connector 20B and the optical connectors 20A and 20B are connected together. In this case, the optical element 221A of the optical connector 20A and the lens 221B of the optical connector 20B face each other, and the light (laser light) emitted from the lens 221B or the optical element 221A configuring the light emitting portion is incident on the optical element 221A or the lens 221B facing each other, and transmission of the optical signal is performed.

In the illustrated example, the lens 221B of the optical connector 20B configures the light emitting portion, and the optical element 221A of the optical connector 20A configures the light incident portion, for example. The light LB2 emitted from the lens 221B mounted on the lower part in the figure of the optical connector 20B is incident on the optical element 221A mounted on the upper part in the figure of the optical connector 20A. Furthermore, the light LB2 emitted from the lens 221B mounted on the upper part in the figure of the optical connector 20B is incident on the optical element 221A mounted on the lower part in the figure of the optical connector 20A.

Note that, an example is similarly conceivable in which the optical element 221A of the optical connector 20A configures the light emitting portion and the lens 221B of the optical connector 20B configures the light incident portion. Furthermore, an example is similarly conceivable in which part of a plurality of the optical elements 221A of the optical connector 20A configures the light emitting portion and the rest of the part configures the light incident portion, and correspondingly part of a plurality of the lenses 221B of the optical connector 20B configures the light incident portion and the rest of the part configures the light emitting portion.

As described above, in the optical connectors 20A and 20B illustrated in FIGS. 8 and 9, at least a part of the light (laser light) emitted from the optical element 221A and the lens 221B as the light emitting portions at the time of non-connection is emitted to the light diffusing portions 211A and 211B on the inner sides of the connector exteriors 21A and 21B and diffused, and the light intensity sufficiently lowers at the distance defined by the safety criteria, and satisfies the safety criteria. That is, the optical connectors 20A and 20B can prevent the laser hazard at the time of non-connection (at the time of removal) with a simple structure.

Note that, in the above, an example has been described in which the optical connector 20A configuring the plug includes the optical element 221A, and the optical connector 20B configuring the receptacle includes the lens 221B. An example is also conceivable in which, conversely, the optical connector 20A configuring the plug includes a lens and the optical connector 20B configuring the receptacle includes an optical element. Moreover, an example is also conceivable in which the optical connector 20A configuring the plug includes a plurality of the light emitting portions and/or light incident portions and some portions are lenses and the other portions are optical elements, and the optical connector 20B configuring the receptacle also includes a plurality of the light emitting portions and/or light incident portions and some portions are lenses and the other portions are optical elements.

"Another Configuration Example of Optical Connector Functioning as Plug or Receptacle"

Figure 11:
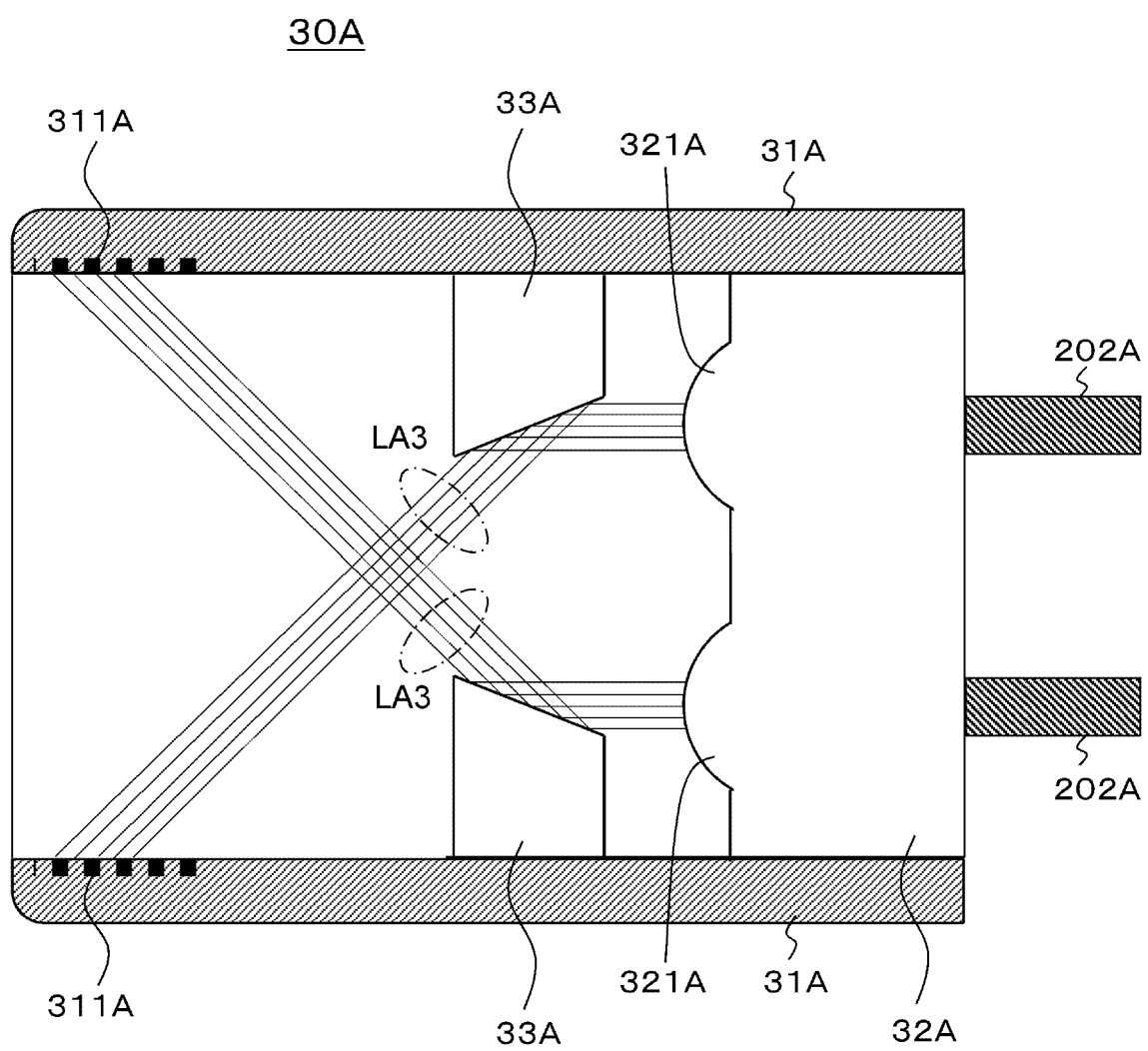
FIG. 11 is a cross-sectional view illustrating a configuration example of an optical connector functioning as a plug.

FIG. 11 illustrates a configuration example of an optical connector 30A. Similarly to the optical connector 10A described above, the optical connector 30A functions as a plug provided at the end of the optical cable body 201. The optical connector 30A includes a cylindrical connector exterior 31A, a block 32A on which a lens 321A is mounted, and a mirror structure 33A.

The block 32A is incorporated in one end side of the connector exterior 31A. The lens 321A is mounted toward the other end side of the connector exterior 31A. The lens 321A is mounted on the block 32A such that the optical axis direction coincides with the longitudinal direction of the connector exterior 31A. The lens 321A configures a light emitting portion in a case where an optical signal is transmitted, and on the other hand, the lens 321A configures a light incident portion in a case where an optical signal is received.

Note that, although two lenses 321A are illustrated in the figure, the present invention is not limited to the illustrated aspect, and any number of lenses 321A of equal to or greater than one may be mounted on the block 32A depending on the number of the optical transmission lines 202A. For example, a lens array in which lenses are arrayed in the thickness direction (vertical direction in the figure) and width direction (depth direction in the figure) of the optical connector 30A may be mounted on the block 32A.

In a case where the lens 321A configures the light emitting portion, the lens 321A collimates light (laser light) output from the optical transmission line 202A and emits the light. Furthermore, in a case where the lens 321A configures the light incident portion, the lens 321A converges incident collimated light (laser light) and inputs the light to the optical transmission line 202A.

The mirror structure 33A is arranged at the other end side corresponding to each lens 321A mounted on the block 32A. Note that, in the example illustrated in the figure, the mirror structure 33A is illustrated to implement specular reflection, but it is not limited thereto, and, for example, it may be a reflective structure in a form of a concave mirror, or a reflective structure using total reflection of a prism.

In a case where the lens 321A configures the light emitting portion, the mirror structure 33A reflects collimated light (laser light) emitted in the longitudinal direction of the connector exterior 31A from the lens 321A to the inner side at an appropriate angle, and changes the direction of the light to a direction inclined with respect to the longitudinal direction of the connector exterior 31A. Furthermore, in a case where the lens 321A configures the light incident portion, to cause the collimating light (laser light) from the direction inclined with respect to the longitudinal direction of the connector exterior 31A to be incident on the lens 321A, the mirror structure 33A reflects the collimated light and changes its direction to the longitudinal direction of the connector exterior 31A.

The connector exterior 31A has a length at which at least a part of collimated light (laser light) LA3 emitted from the lens 321A configuring the emitting portion and reflected by the mirror structure 33A can be emitted to the inner side (inner wall). In other words, in this case, at least a part of the collimated light LA3 emitted from the lens 321A and reflected by the mirror structure 33A is emitted to the inner side (inner wall) of the connector exterior 31A and diffused. In the example illustrated in the figure, an example is illustrated in which all is emitted. This prevents a laser hazard at the time of removal.

A light diffusing portion 311A is formed in a portion to which the collimated light can be emitted of the connector exterior 31A. The light diffusing portion 311A is not particularly limited as long as it diffuses light, and may be, for example, a rough surface or a porous film such as an anodized aluminum layer. The anodized aluminum layer can be formed easily and inexpensively, and is excellent in light diffusibility. In a case where the light diffusing portion 311A is an anodized aluminum layer, the connector exterior 31A includes aluminum.

Figure 12:
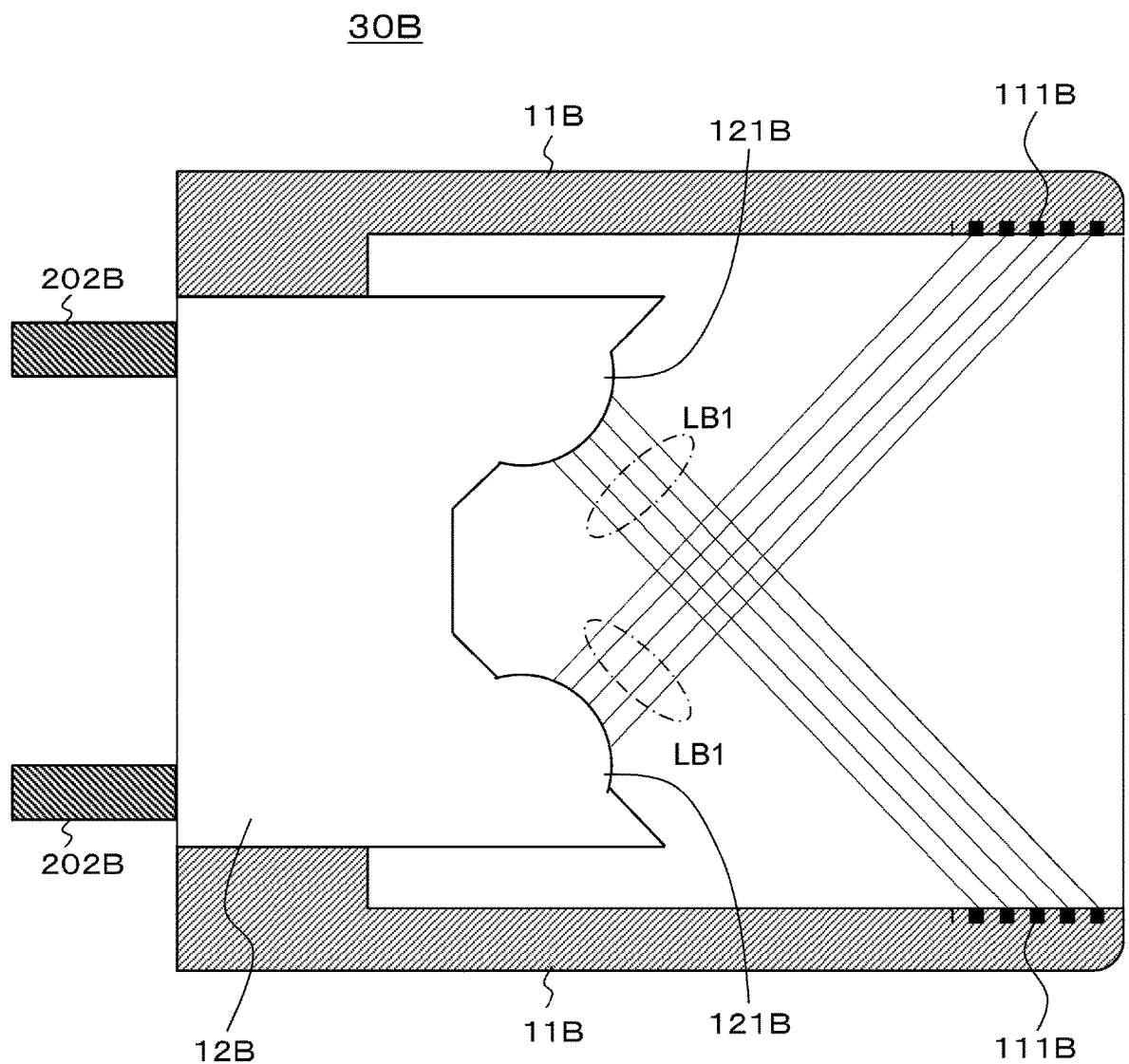
FIG. 12 is a cross-sectional view illustrating a configuration example of an optical connector functioning as a receptacle.

FIG. 12 illustrates a configuration example of an optical connector 30B. Similarly to the optical connector 10B described above, the optical connector 30B functions as a receptacle provided to the housing of the electronic device 100. Since the optical connector 30B is configured similarly to the optical connector 10B illustrated in FIG. 5, the same reference numerals are given to the corresponding portions, and a detailed description thereof will be omitted.

Figure 13:
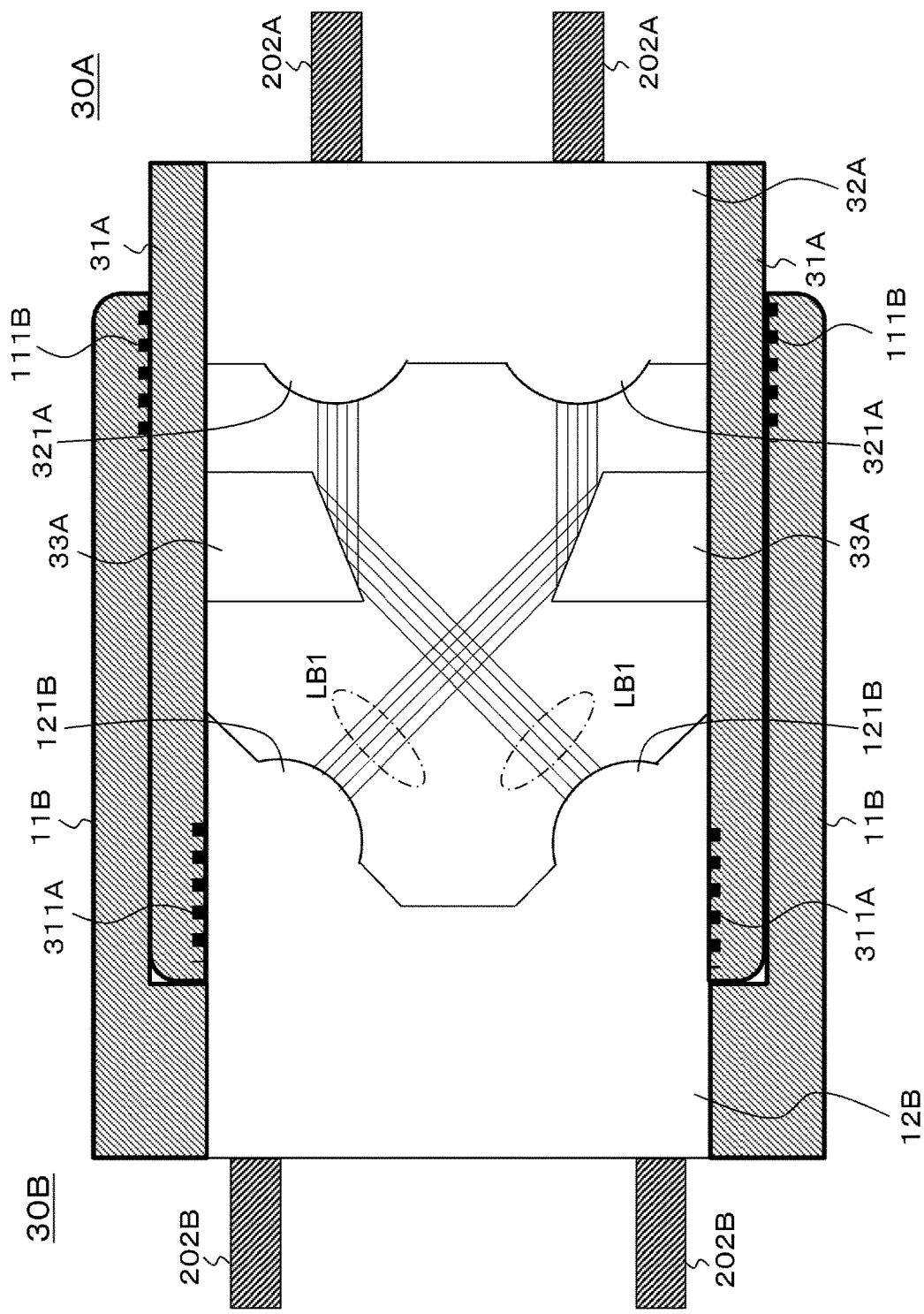
FIG. 13 is a diagram illustrating a state in which the optical connector functioning as the plug and the optical connector functioning as the receptacle are connected together.

FIG. 13 illustrates a state in which the optical connector 30A is inserted into the optical connector 30B and the optical connectors 30A and 30B are connected together. In this case, a reflecting surface of the mirror structure 33A of the optical connector 30A and the lens 121B of the optical connector 30B face each other, and the collimated light (laser light) emitted from the lens of one optical connector is reflected by the mirror structure 33A to be incident on the lens of the other optical connector, and transmission of the optical signal is performed.

In the illustrated example, the lens 121B of the optical connector 30B configures the light emitting portion, and the lens 321A of the optical connector 30A configures the light incident portion, for example. The collimated light LB1 emitted from the lens 121B mounted on the lower part in the figure of the optical connector 30B is reflected by the mirror structure 33A arranged at the upper part in the figure of the optical connector 30A, and is incident on the lens 321A mounted on the upper part in the figure of the optical connector 30A. Furthermore, the collimated light LB1 emitted from the lens 121B mounted on the upper part in the figure of the optical connector 30B is reflected by the mirror structure 33A arranged at the lower part in the figure of the optical connector 30A, and is incident on the lens 321A mounted on the lower part in the figure of the optical connector 30A.

Note that, an example is similarly conceivable in which the lens 321A of the optical connector 30A configures the light emitting portion and the lens 121B of the optical connector 30B configures the light incident portion. Furthermore, an example is similarly conceivable in which part of a plurality of the lenses 321A of the optical connector 30A configures the light emitting portion and the rest of the part configures the light incident portion, and correspondingly part of the plurality of the lenses 121B of the optical connector 30B configures the light incident portion and the rest of the part configures the light emitting portion.

As described above, in the optical connectors 30A and 30B illustrated in FIGS. 11 and 12, at least a part of the collimated light (laser light) emitted from the lenses 321A and 121B as the light emitting portions at the time of non-connection is emitted to the light diffusing portions 311A and 111B on the inner sides of the connector exteriors 31A and 11B and diffused, and the light intensity sufficiently lowers at the distance defined by the safety criteria, and satisfies the safety criteria. That is, the optical connectors 30A and 30B can prevent the laser hazard at the time of non-connection (at the time of removal) with a simple structure.

Note that, in the above, an example has been described in which the optical connector 30A configuring the plug includes the mirror structure 33A, and the optical connector 30B configuring the receptacle does not include the mirror structure. An example is also conceivable in which, conversely, the optical connector 30A configuring the plug does not include the mirror structure and the optical connector 30B configuring the receptacle includes the mirror structure.

"Another Configuration Example of Optical Connector Functioning as Plug or Receptacle"

Figure 14:
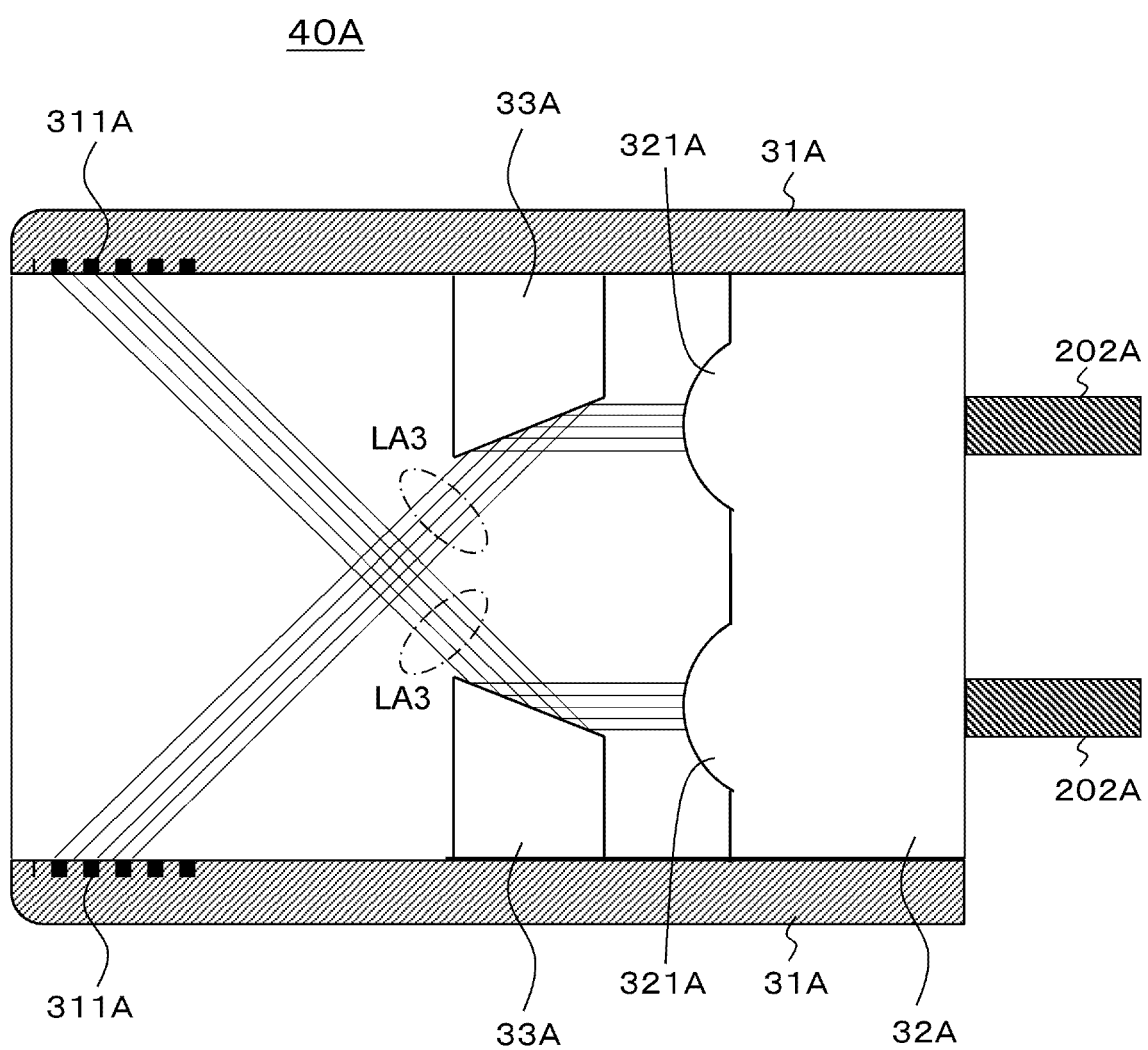
FIG. 14 is a cross-sectional view illustrating a configuration example of an optical connector functioning as a plug.

FIG. 14 illustrates a configuration example of an optical connector 40A. Similarly to the optical connector 10A described above, the optical connector 40A functions as a plug provided at the end of the optical cable body 201. Since the optical connector 40A is configured similarly to the optical connector 30B illustrated in FIG. 11, the same reference numerals are given to the corresponding portions, and a detailed description thereof will be omitted.

Figure 15:
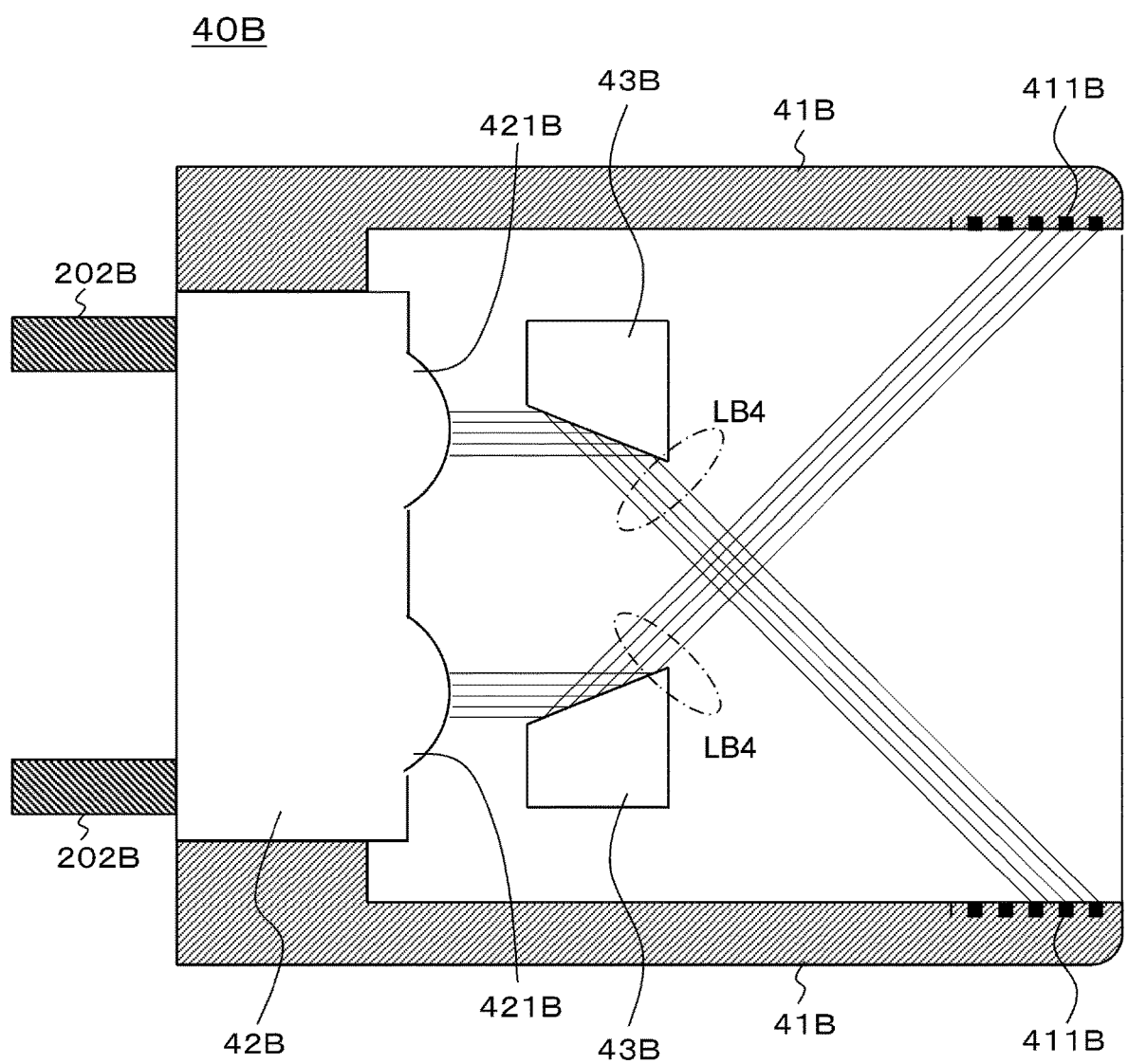
FIG. 15 is a cross-sectional view illustrating a configuration example of an optical connector functioning as a receptacle.

FIG. 15 illustrates a configuration example of an optical connector 40B. Similarly to the optical connector 10B described above, the optical connector 40B functions as a receptacle provided to the housing of the electronic device 100. The optical connector 40B includes a cylindrical connector exterior 41B, a block 42B on which a lens 421B is mounted, and a mirror structure 43B.

The block 42B is incorporated in one end side of the connector exterior 41B. The lens 421B is mounted toward the other end side of the connector exterior 41B. The lens 421B is mounted on the block 42B such that the optical axis direction coincides with the longitudinal direction of the connector exterior 41B. The lens 421B configures a light emitting portion in a case where an optical signal is transmitted, and on the other hand, the lens 421B configures a light incident portion in a case where an optical signal is received.

Note that, although two lenses 421B are illustrated in the figure, the present invention is not limited to the illustrated aspect, and any number of lenses 421B of equal to or greater than one may be mounted on the block 42B depending on the number of the optical transmission lines 202B. For example, a lens array in which lenses are arrayed in the thickness direction (vertical direction in the figure) and width direction (depth direction in the figure) of the optical connector 40B may be mounted on the block 42B.

In a case where the lens 421B configures the light emitting portion, the lens 421B collimates light (laser light) output from the optical transmission line 202B and emits the light. Furthermore, in a case where the lens 421B configures the light incident portion, the lens 421B converges incident collimated light (laser light) and inputs the light to the optical transmission line 202B.

The mirror structure 43B is arranged at the other end side corresponding to each lens 421B mounted on the block 42B. Note that, in the example illustrated in the figure, the mirror structure 43B is illustrated to implement specular reflection, but it is not limited thereto, and, for example, it may be a reflective structure in a form of a concave mirror.

In a case where the lens 421B configures the light emitting portion, the mirror structure 43B reflects collimated light (laser light) emitted in the longitudinal direction of the connector exterior 41B from the lens 421B to the inner side at an appropriate angle, and changes the direction of the light to a direction inclined with respect to the longitudinal direction of the connector exterior 41B. Furthermore, in a case where the lens 421B configures the light incident portion, to cause the collimating light (laser light) from the direction inclined with respect to the longitudinal direction of the connector exterior 41B to be incident on the lens 421B, the mirror structure 43B reflects the collimated light and changes its direction to the longitudinal direction of the connector exterior 41B.

The connector exterior 41B has a length at which at least a part of collimated light (laser light) LB4 emitted from the lens 421B configuring the emitting portion and reflected by the mirror structure 43B can be emitted to the inner side (inner wall). In other words, in this case, at least a part of the collimated light LB4 emitted from the lens 421B and reflected by the mirror structure 43B is emitted to the inner side (inner wall) of the connector exterior 41B and diffused. In the example illustrated in the figure, an example is illustrated in which all is emitted. This prevents a laser hazard.

A light diffusing portion 411B is formed in a portion to which the collimated light can be emitted of the connector exterior 41B. The light diffusing portion 411B is not particularly limited as long as it diffuses light, and may be, for example, a rough surface or a porous film such as an anodized aluminum layer. The anodized aluminum layer can be formed easily and inexpensively, and is excellent in light diffusibility. In a case where the light diffusing portion 411B is an anodized aluminum layer, the connector exterior 41B includes aluminum.

Figure 16:
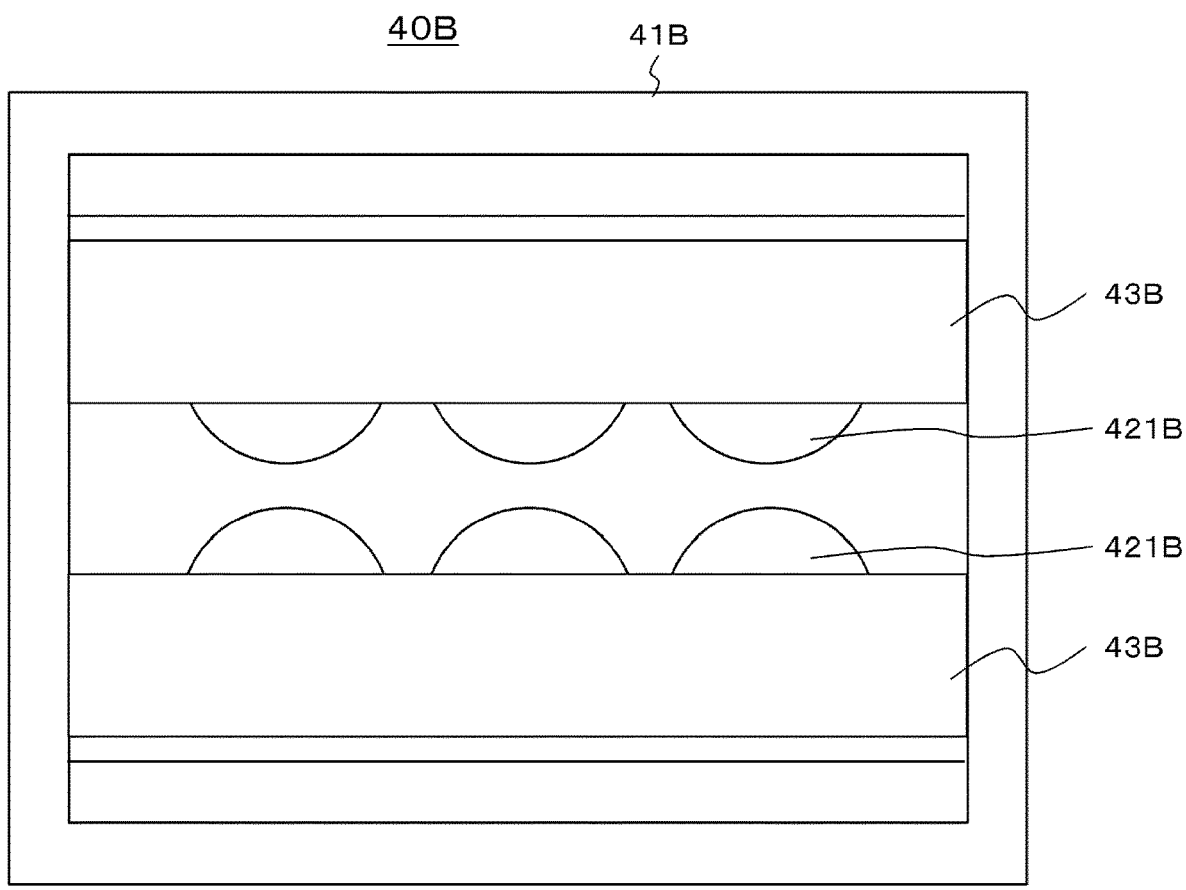
FIG. 16 is a front view of the optical connector functioning as the receptacle as viewed from its opening side.

FIG. 16 illustrates a front view of the optical connector 40B as viewed from its opening side. The mirror structure 43B has a structure in which two ends in the width direction (the left-right direction in the figure) are fixed to the connector exterior 41B.

Figure 17:
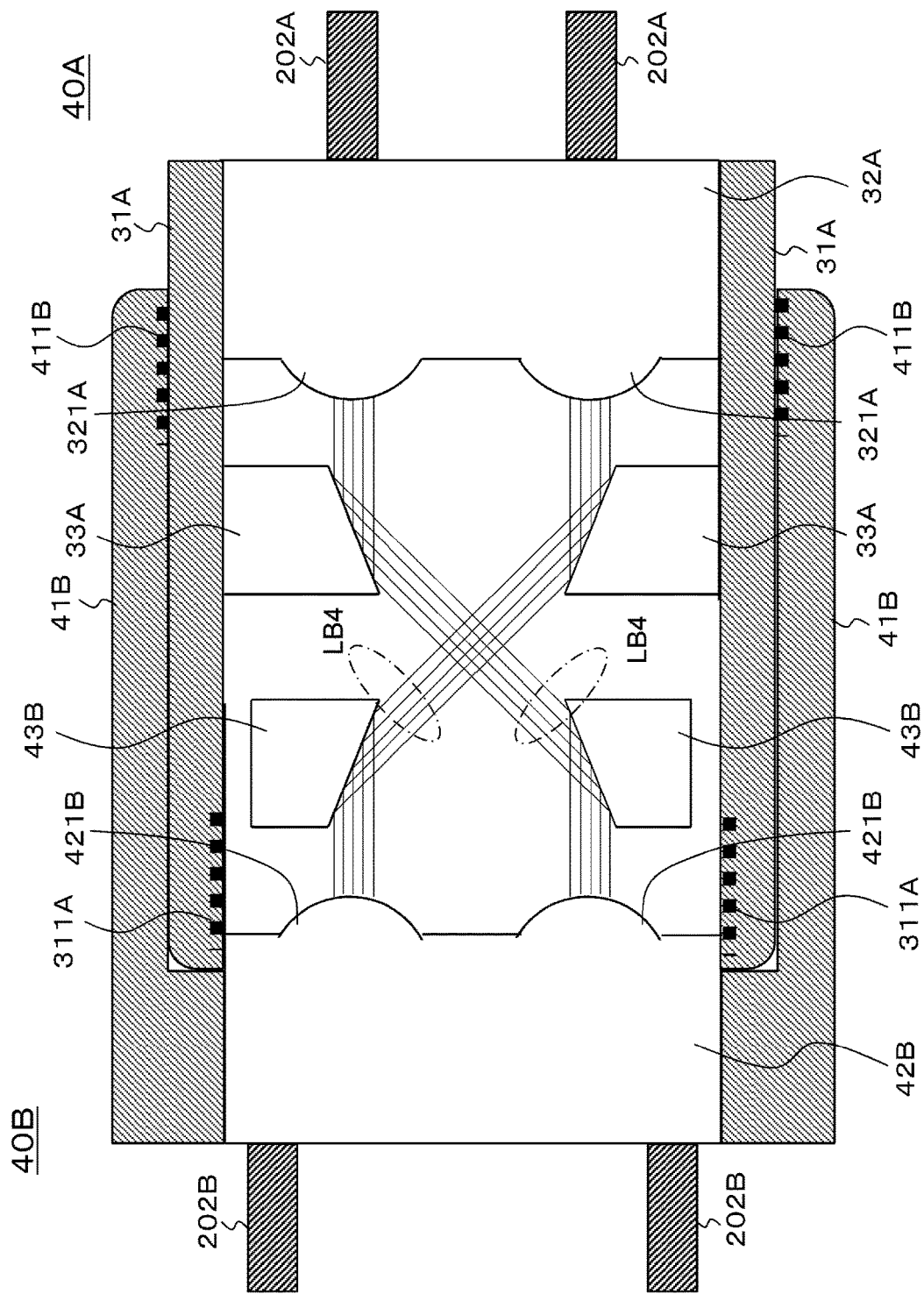
FIG. 17 is a diagram illustrating a state in which the optical connector functioning as the plug and the optical connector functioning as the receptacle are connected together.

FIG. 17 illustrates a state in which the optical connector 40A is inserted into the optical connector 40B and the optical connectors 40A and 40B are connected together. In this case, a reflecting surface of the mirror structure 43B of the optical connector 40B and a reflecting surface of the mirror structure 33A of the optical connector 40A face each other, and the collimated light (laser light) emitted from the lens of one optical connector is reflected by the two mirror structures to be incident on the lens of the other optical connector, and transmission of the optical signal is performed.

In the illustrated example, the lens 421B of the optical connector 40B configures the light emitting portion, and the lens 321A of the optical connector 40A configures the light incident portion, for example. The collimated light LB4 emitted from the lens 421B mounted on the lower part in the figure of the optical connector 40B is reflected by the mirror structure 43B arranged at the lower part in the figure of the optical connector 40B, and is further reflected by the mirror structure 33A arranged at the upper part in the figure of the optical connector 40A, and is incident on the lens 321A mounted on the upper part in the figure of the optical connector 40A.

Furthermore, the collimated light LB4 emitted from the lens 421B mounted on the upper part in the figure of the optical connector 40B is reflected by the mirror structure 43B arranged at the upper part in the figure of the optical connector 40B, and is further reflected by the mirror structure 33A arranged at the lower part in the figure of the optical connector 40A, and is incident on the lens 321A mounted on the lower part in the figure of the optical connector 40A.

Note that, an example is similarly conceivable in which the lens 321A of the optical connector 40A configures the light emitting portion and the lens 421B of the optical connector 40B configures the light incident portion. Furthermore, an example is similarly conceivable in which part of a plurality of the lenses 321A of the optical connector 40A configures the light emitting portion and the rest of the part configures the light incident portion, and correspondingly part of a plurality of the lenses 421B of the optical connector 40B configures the light incident portion and the rest of the part configures the light emitting portion.

As described above, in the optical connectors 40A and 40B illustrated in FIGS. 14 and 15, at least a part of the collimated light (laser light) emitted from the lenses 321A and 421B as the light emitting portions at the time of non-connection is emitted to the light diffusing portions 311A and 411B on the connector exteriors 31A and 41B and diffused, and the light intensity sufficiently lowers at the distance defined by the safety criteria, and satisfies the safety criteria. That is, the optical connectors 40A and 40B can prevent the laser hazard at the time of non-connection (at the time of removal) with a simple structure.

2. Application Example

The technology according to the present disclosure can be applied to various products. The technology according to the present disclosure may be implemented as a device mounted on any type of mobile body, for example, a car, an electric car, a hybrid electric car, a motorcycle, a bicycle, a personal mobility, an airplane, a drone, a ship, a robot, a construction machine, an agricultural machine (tractor), and the like.

Figure 18:
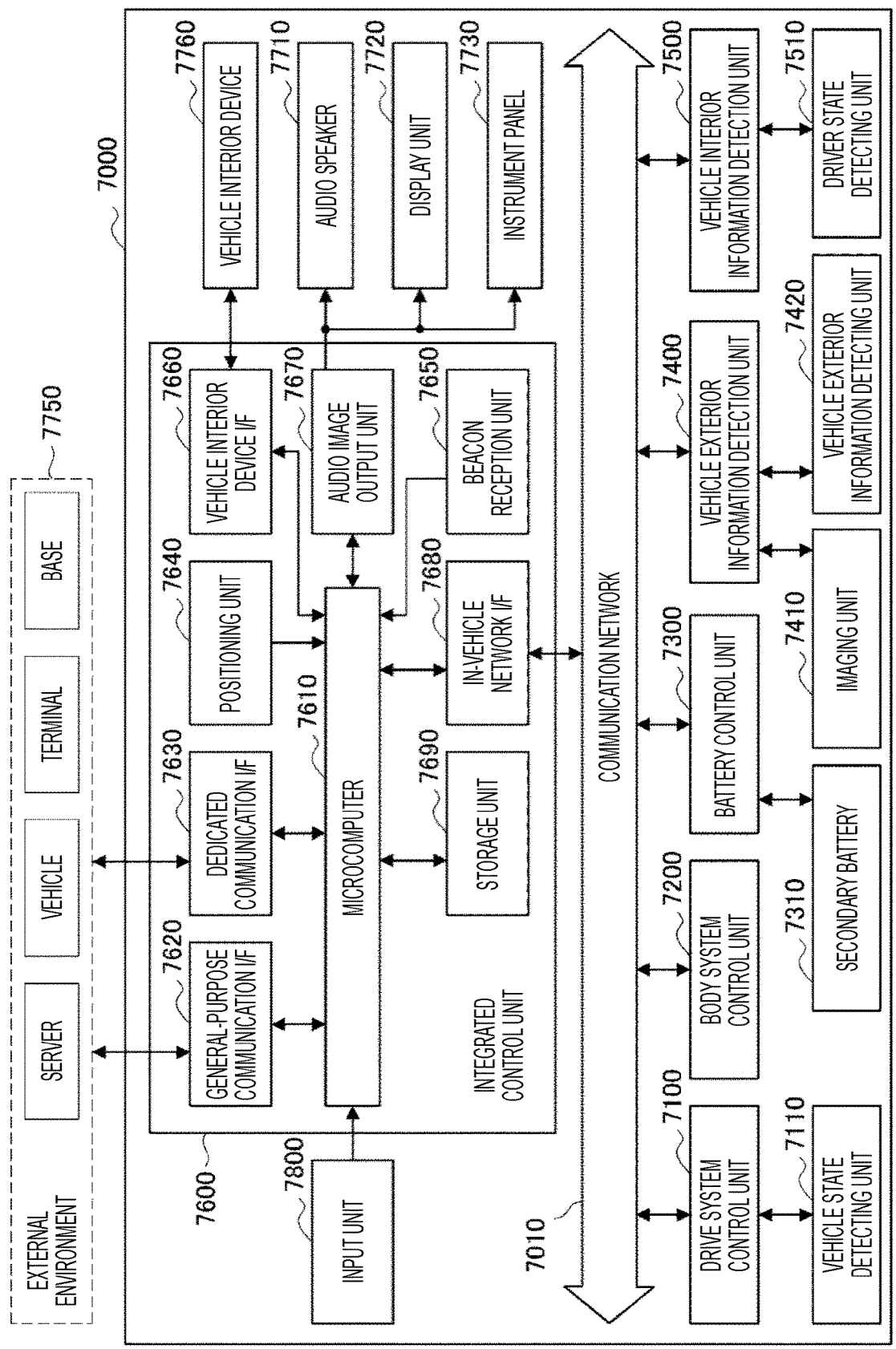
FIG. 18 is a block diagram illustrating an example of a schematic configuration of a vehicle control system.

FIG. 18 is a block diagram illustrating a schematic configuration example of a vehicle control system 7000 that is an example of a mobile body control system to which the technology according to the present disclosure can be applied. The vehicle control system 7000 includes a plurality of electronic control units connected to each other via a communication network 7010. In the example illustrated in FIG. 18, the vehicle control system 7000 includes a drive system control unit 7100, a body system control unit 7200, a battery control unit 7300, a vehicle exterior information detection unit 7400, a vehicle interior information detection unit 7500, and an integrated control unit 7600. The communication network 7010 connecting these plural control units to each other may be, for example, an in-vehicle communication network conforming to an arbitrary standard such as Controller Area Network (CAN), Local Interconnect Network (LIN), Local Area Network (LAN), or FlexRay (registered trademark).

Each control unit includes a microcomputer that performs arithmetic processing in accordance with various programs, a storage unit that stores programs executed by the microcomputer, parameters used for various calculations, or the like, and a drive circuit that drives devices to be controlled. Each control unit includes a network I/F for communicating with other control units via the communication network 7010, and a communication I/F for communicating with devices inside and outside a vehicle, a sensor, or the like by wired communication or wireless communication. FIG. 18 illustrates, as a functional configuration of the integrated control unit 7600, a microcomputer 7610, a general-purpose communication I/F 7620, a dedicated communication I/F 7630, a positioning unit 7640, a beacon reception unit 7650, a vehicle interior device I/F 7660, an audio image output unit 7670, an in-vehicle network I/F 7680, and a storage unit 7690. Similarly, the other control units each include a microcomputer, a communication I/F, a storage unit, and the like.

The drive system control unit 7100 controls operation of devices related to a drive system of a vehicle in accordance with various programs. For example, the drive system control unit 7100 functions as a control device of a driving force generating device for generating driving force of the vehicle, such as an internal combustion engine or a driving motor, a driving force transmitting mechanism for transmitting driving force to wheels, a steering mechanism for adjusting a steering angle of the vehicle, a braking device for generating braking force of the vehicle, and the like. The drive system control unit 7100 may include a function as a control device, such as Antilock Brake System (ABS) or Electronic Stability Control (ESC).

The drive system control unit 7100 is connected to a vehicle state detecting unit 7110. The vehicle state detecting unit 7110 includes, for example, at least one of a gyro sensor that detects angular velocity of axis rotational motion of a vehicle body, an acceleration sensor that detects acceleration of the vehicle, or a sensor for detecting an operation amount of the accelerator pedal, an operation amount of the brake pedal, a steering angle of the steering wheel, engine speed or wheel rotation speed, or the like. The drive system control unit 7100 performs arithmetic processing using a signal input from the vehicle state detecting unit 7110, and controls the internal combustion engine, the driving motor, the electric power steering device, the brake device, or the like.

The body system control unit 7200 controls operation of various devices equipped on the vehicle body in accordance with various programs. For example, the body system control unit 7200 functions as a control device of a keyless entry system, a smart key system, a power window device, or various lamps such as a head lamp, a back lamp, a brake lamp, a turn signal lamp, and a fog lamp. In this case, to the body system control unit 7200, a radio wave transmitted from a portable device that substitutes for a key, or signals of various switches can be input. The body system control unit 7200 accepts input of these radio waves or signals and controls the door lock device, power window device, lamp, and the like of the vehicle.

The battery control unit 7300 controls a secondary battery 7310 that is a power supply source of the driving motor in accordance with various programs. For example, information such as a battery temperature, a battery output voltage, or a battery remaining capacity is input from a battery device including the secondary battery 7310 to the battery control unit 7300. The battery control unit 7300 performs arithmetic processing using these signals, and performs temperature adjustment control of the secondary battery 7310 or control of a cooling device or the like provided in the battery device.

The vehicle exterior information detection unit 7400 detects information on the outside of the vehicle on which the vehicle control system 7000 is mounted. For example, at least one of an imaging unit 7410 or a vehicle exterior information detecting unit 7420 is connected to the vehicle exterior information detection unit 7400. The imaging unit 7410 includes at least one of a Time Of Flight (ToF) camera, a stereo camera, a monocular camera, an infrared camera, or other cameras. To the vehicle exterior information detecting unit 7420, for example, an environmental sensor for detecting the current climate or weather, or a peripheral information detection sensor for detecting another vehicle, an obstacle, a pedestrian, or the like around the vehicle on which the vehicle control system 7000 is mounted.

The environmental sensor may be, for example, at least one of a raindrop sensor that detects rainy weather, a fog sensor that detects fog, a sunshine sensor that detects sunshine degree, or a snow sensor that detects snowfall. The peripheral information detection sensor may be at least one of an ultrasonic sensor, a radar device, or a Light Detection and Ranging (LIDAR) device (Laser Imaging Detection and Ranging (LIDAR) device). The imaging unit 7410 and the vehicle exterior information detecting unit 7420 may be provided as independent sensors or devices, respectively, or may be provided as a device in which a plurality of sensors or devices is integrated together.

Figure 19:
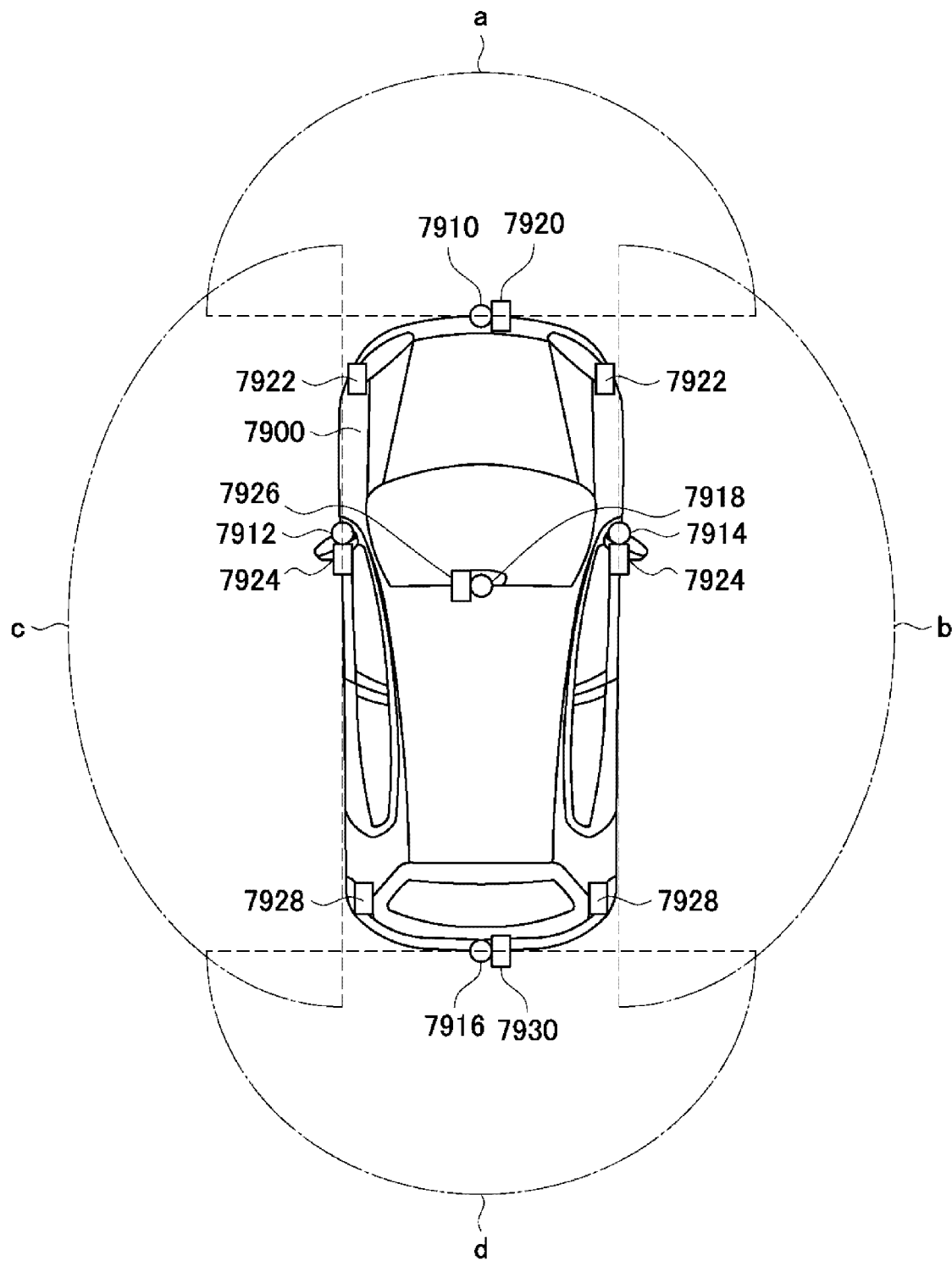
FIG. 19 is an explanatory diagram illustrating an example of installation positions of a vehicle exterior information detecting unit and an imaging unit.

Here, FIG. 19 illustrates an example of installation positions of the imaging unit 7410 and the vehicle exterior information detecting unit 7420. Imaging units 7910, 7912, 7914, 7916, and 7918 are provided at, for example, at least one position of the front nose, the side mirror, the rear bumper, the back door, the upper part of the windshield in the vehicle interior, of a vehicle 7900. The imaging unit 7910 provided at the front nose and the imaging unit 7918 provided at the upper part of the windshield in the vehicle interior mainly acquire images ahead of the vehicle 7900. The imaging units 7912 and 7914 provided at the side mirrors mainly acquire images on the sides of the vehicle 7900. The imaging unit 7916 provided at the rear bumper or the back door mainly acquires an image behind the vehicle 7900. The imaging unit 7918 provided on the upper part of the windshield in the vehicle interior is mainly used for detecting a preceding vehicle, a pedestrian, an obstacle, a traffic signal, a traffic sign, a lane, or the like.

Note that, FIG. 19 illustrates an example of imaging ranges of the imaging units 7910, 7912, 7914, and 7916. An imaging range a indicates an imaging range of the imaging unit 7910 provided at the front nose, imaging ranges b and c respectively indicate imaging ranges of the imaging units 7912 and 7914 provided at the side mirrors, an imaging range d indicates an imaging range of the imaging unit 7916 provided at the rear bumper or the back door. For example, image data captured by the imaging units 7910, 7912, 7914, and 7916 are superimposed on each other, whereby an overhead image is obtained of the vehicle 7900 viewed from above.

Vehicle exterior information detecting units 7920, 7922, 7924, 7926, 7928, and 7930 provided on the front, rear, side, corner, upper part of the windshield in the vehicle interior of the vehicle 7900 may be ultrasonic sensors or radar devices, for example. The vehicle exterior information detecting units 7920, 7926, 7928, and 7930 provided on the front nose, rear bumper, back door, and upper part of the windshield in the vehicle interior of the vehicle 7900 may be LIDAR devices, for example. These vehicle exterior information detecting units 7920 to 7930 are mainly used for detecting a preceding vehicle, a pedestrian, an obstacle, or the like.

Referring back to FIG. 18, the description will be continued. The vehicle exterior information detection unit 7400 causes the imaging unit 7410 to capture an image outside the vehicle and receives the image data captured. Furthermore, the vehicle exterior information detection unit 7400 receives detected information from the connected vehicle exterior information detecting unit 7420. In a case where the vehicle exterior information detecting unit 7420 is an ultrasonic sensor, a radar device, or a LIDAR device, the vehicle exterior information detection unit 7400 transmits ultrasonic waves, electromagnetic waves, or the like, and receives information on received reflected waves. The vehicle exterior information detection unit 7400 may perform object detection processing or distance detection processing on a person, a car, an obstacle, a sign, a character on a road surface, or the like, on the basis of the received information. The vehicle exterior information detection unit 7400 may perform environment recognition processing for recognizing rainfall, fog, road surface condition, or the like on the basis of the received information. The vehicle exterior information detection unit 7400 may calculate a distance to an object outside the vehicle on the basis of the received information.

Furthermore, the vehicle exterior information detection unit 7400 may perform distance detection processing or image recognition processing for recognizing a person, a car, an obstacle, a sign, a character on a road surface, or the like, on the basis of the received image data. The vehicle exterior information detection unit 7400 may perform processing such as distortion correction or alignment on the received image data, and synthesize the image data captured by different imaging units 7410 to generate an overhead image or a panoramic image. The vehicle exterior information detection unit 7400 may perform viewpoint conversion processing using the image data captured by different imaging units 7410.

The vehicle interior information detection unit 7500 detects information on the inside of the vehicle. The vehicle interior information detection unit 7500 is connected to, for example, a driver state detecting unit 7510 that detects a state of a driver. The driver state detecting unit 7510 may include a camera that captures an image of the driver, a biometric sensor that detects biological information of the driver, a microphone that collects sound in the vehicle interior, and the like. The biometric sensor is provided, for example, on a seat surface, a steering wheel, or the like, and detects biological information of an occupant sitting on a seat or a driver holding the steering wheel. The vehicle interior information detection unit 7500 may calculate a degree of fatigue or a degree of concentration of the driver on the basis of detected information input from the driver state detecting unit 7510, and may determine whether or not the driver is dozing. The vehicle interior information detection unit 7500 may perform noise canceling processing or the like on a collected sound signal.

The integrated control unit 7600 controls overall operation in the vehicle control system 7000 in accordance with various programs. The integrated control unit 7600 is connected to an input unit 7800. The input unit 7800 is implemented by a device, for example, a touch panel, a button, a microphone, a switch, a lever, or the like to which input operation by the occupant can be performed. Data obtained by performing voice recognition on the sound input by the microphone may be input to the integrated control unit 7600. The input unit 7800 may be, for example, a remote control device using infrared rays or other radio waves, or an external connection device such as a mobile phone or a personal digital assistant (PDA) adaptable to the operation of the vehicle control system 7000. The input unit 7800 may be a camera, for example, and in that case, the occupant can input information by gesture. Alternatively, data may be input obtained by detecting movement of a wearable device worn by the occupant. Moreover, the input unit 7800 may include, for example, an input control circuit or the like that generates an input signal on the basis of information input by the occupant or the like using the input unit 7800, and outputs the input signal to the integrated control unit 7600. By operating the input unit 7800, the occupant or the like inputs various data to the vehicle control system 7000 or gives an instruction to perform processing operation.

The storage unit 7690 may include read only memory (ROM) that stores various programs executed by the microcomputer 7610, and random access memory (RAM) that stores various parameters, calculation results, sensor values, or the like. Furthermore, the storage unit 7690 may be implemented by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various devices existing in an external environment 7750. The general-purpose communication I/F 7620 may implement a cellular communication protocol such as Global System of Mobile communications (GSM), WiMAX, Long Term Evolution (LTE), or LTE-Advanced (LTE-A), or other wireless communication protocols such as a wireless LAN (also referred to as Wi-Fi (registered trademark)), and Bluetooth (registered trademark). For example, the general-purpose communication I/F 7620 may connect to a device (for example, an application server or a control server) existing on an external network (for example, the Internet, a cloud network, or a company specific network) via a base station or an access point. Furthermore, the general-purpose communication I/F 7620 may connect to a terminal existing in the vicinity of the vehicle (for example, a terminal of a driver, a pedestrian, or a shop, or a Machine Type Communication (MTC) terminal) by using a Peer To Peer (P2P) technology, for example.

The dedicated communication I/F 7630 is a communication I/F supporting a communication protocol formulated for use in vehicles. For example, the dedicated communication I/F 7630 may implement a standard protocol such as Wireless Access in Vehicle Environment (WAVE) that is a combination of IEEE 802.11p of the lower layer and IEEE 1609 of the upper layer, Dedicated Short Range Communications (DSRC), or a cellular communication protocol. The dedicated communication I/F 7630 typically performs V2X communication that is a concept including one or more of Vehicle to Vehicle communication, Vehicle to Infrastructure communication, Vehicle to Home communication, and Vehicle to Pedestrian communication.

For example, the positioning unit 7640 receives a Global Navigation Satellite System (GNSS) signal (for example, a Global Positioning System (GPS) signal from a GPS satellite) from a GNSS satellite to execute positioning, and generates position information including the latitude, longitude, and altitude of the vehicle. Note that, the positioning unit 7640 may specify the current position by exchanging signals with a wireless access point, or may acquire the position information from a terminal such as a mobile phone, a PHS, or a smartphone having a positioning function.

The beacon reception unit 7650 receives radio waves or electromagnetic waves transmitted from a wireless station or the like installed on a road, for example, and acquires information such as the current position, congestion, road closure, or required time. Note that, the function of the beacon reception unit 7650 may be included in the dedicated communication I/F 7630 described above.

The vehicle interior device I/F 7660 is a communication interface that mediates connection between the microcomputer 7610 and various vehicle interior devices 7760 existing in the vehicle. The vehicle interior device I/F 7660 may establish a wireless connection using a wireless communication protocol such as a wireless LAN, Bluetooth (registered trademark), near field communication (NFC), or Wireless USB (WUSB). Furthermore, the vehicle interior device I/F 7660 may establish a wired connection such as a Universal Serial Bus (USB), High-Definition Multimedia Interface (HDMI), or Mobile High-definition Link (MHL) via a connection terminal (and a cable if necessary) not illustrated. The vehicle interior device 7760 may include, for example, at least one of a mobile device or a wearable device possessed by the occupant, or an information device carried in or attached to the vehicle. Furthermore, the vehicle interior device 7760 may include a navigation device that performs a route search to an arbitrary destination. The vehicle interior device I/F 7660 exchanges control signals or data signals with these vehicle interior devices 7760.

The in-vehicle network I/F 7680 is an interface that mediates communication between the microcomputer 7610 and the communication network 7010. The in-vehicle network I/F 7680 transmits and receives signals and the like in accordance with a predetermined protocol supported by the communication network 7010.

The microcomputer 7610 of the integrated control unit 7600 controls the vehicle control system 7000 in accordance with various programs on the basis of information acquired via at least one of the general-purpose communication I/F 7620, the dedicated communication I/F 7630, the positioning unit 7640, the beacon reception unit 7650, the vehicle interior device I/F 7660, or the in-vehicle network I/F 7680. For example, the microcomputer 7610 may calculate a control target value of the driving force generating device, the steering mechanism, or the braking device on the basis of acquired information inside and outside the vehicle, and output a control command to the drive system control unit 7100. For example, the microcomputer 7610 may perform cooperative control aiming for implementing functions of advanced driver assistance system (ADAS) including collision avoidance or shock mitigation of the vehicle, follow-up traveling based on an inter-vehicle distance, vehicle speed maintaining traveling, vehicle collision warning, vehicle lane departure warning, or the like. Furthermore, the microcomputer 7610 may perform cooperative control aiming for automatic driving or the like that autonomously travels without depending on operation of the driver, by controlling the driving force generating device, the steering mechanism, the braking device, or the like on the basis of acquired information around the vehicle.

The microcomputer 7610 may generate three-dimensional distance information between the vehicle and an object such as a surrounding structure or a person on the basis of information acquired via at least one of the general-purpose communication I/F 7620, the dedicated communication I/F 7630, the positioning unit 7640, the beacon reception unit 7650, the vehicle interior device I/F 7660, and the in-vehicle network I/F 7680, and create local map information including peripheral information of the current position of the vehicle. Furthermore, on the basis of the acquired information, the microcomputer 7610 may predict danger such as collision of a vehicle, approach of a pedestrian or the like, or entry into a road closed, and generate a warning signal. The warning signal may be, for example, a signal for generating a warning sound or for turning on a warning lamp.

The audio image output unit 7670 transmits an output signal of at least one of the audio or image to an output device capable of visually or aurally notifying an occupant in the vehicle or the outside of the vehicle of information. In the example of FIG. 18, as the output device, an audio speaker 7710, a display unit 7720, and an instrument panel 7730 are illustrated. The display unit 7720 may include, for example, at least one of an on-board display or a head-up display. The display unit 7720 may have an Augmented Reality (AR) display function. The output device may be another device other than these devices, such as a lamp, a projector, or a wearable device such as a headphone and an eyeglass type display worn by the occupant. In a case where the output device is a display device, the display device visually displays results obtained by the various types of processing performed by the microcomputer 7610 or information received from the other control units in various formats such as text, an image, a table, or a graph. Furthermore, in a case where the output device is an audio output device, the audio output device converts an audio signal including reproduced audio data, acoustic data, and the like into an analog signal to aurally output the analog signal.

Note that, in the example illustrated in FIG. 18, at least two control units connected together via the communication network 7010 may be integrated as one control unit. Alternatively, each control unit may be configured by plural control units. Moreover, the vehicle control system 7000 may include another control unit not illustrated. Furthermore, in the above description, some or all of the functions performed by any of the control units may be performed by another control unit. That is, as long as information is transmitted and received via the communication network 7010, predetermined arithmetic processing may be performed by any of the control units. Similarly, a sensor or device connected to any of the control units may be connected to another control unit, and plural control units may mutually transmit and receive detected information via the communication network 7010.

Note that, a computer program for implementing each function of the electronic device 100 according to the present embodiment described with reference to FIGS. 1 and 7 can be implemented in any of the control units or the like. Furthermore, it is also possible to provide a computer readable recording medium in which such a computer program is stored. The recording medium is, for example, a magnetic disk, an optical disk, a magneto-optical disk, a flash memory, or the like. Furthermore, the above computer program may be distributed via, for example, a network without using a recording medium.

In the vehicle control system 7000 described above, the optical connectors 10A to 60A and 10B to 60B described with reference to FIGS. 1 to 17 can be applied to the various interfaces illustrated in FIG. 18. For example, the optical connectors 10A to 60A and 10B to 60B can be applied as communication connectors in the general-purpose communication I/F 7620, the dedicated communication I/F 7630, the vehicle interior device I/F 7660, the audio image output unit 7670, and the in-vehicle network I/F 7680, and the external environment 7750, the vehicle interior device 7760, the audio speaker 7710, the display unit 7720, the instrument panel 7730, the communication network 7010, and the like adaptable thereto. Furthermore, the electronic device according to the present disclosure, for example, the electronic device 100 can be applied to the integrated control unit 7600, for example. Moreover, the optical cable according to the present disclosure, for example, the optical cable 200 can be applied to connection to the communication network 7010, as well as to the interfaces and devices inside and outside the vehicle control system 7000.

Furthermore, at least a part of the components of the electronic device 100 described with reference to FIGS. 1 and 7 may be implemented in a module (for example, an integrated circuit module including one die) for the integrated control unit 7600 illustrated in FIG. 18. Alternatively, the electronic device 100 described with reference to FIG. 7 may be implemented by plural control units of the vehicle control system 7000 illustrated in FIG. 18.

3. Modifications

In the above, the preferred embodiments of the present disclosure have been described in detail with reference to the accompanying drawings; however, the technical scope of the present disclosure is not limited to such examples. It is obvious that persons having ordinary knowledge in the technical field of the present disclosure can conceive various modification examples or correction examples within the scope of the technical idea described in the claims, and it is understood that the modification examples or correction examples also belong to the technical scope of the present disclosure.

Furthermore, the effects described in the present specification are merely illustrative or exemplary and not restrictive. That is, the technology according to the present disclosure can exhibit other effects obvious to those skilled in the art from the description of the present specification together with the above-described effects or in place of the above effects.

Note that, the following configuration also belongs to the technical scope of the present disclosure.

(1) An optical connector including:

a cylindrical connector exterior; and a block that is incorporated in one end side of the connector exterior and in which a light emitting portion or a light incident portion is mounted toward another end side of the connector exterior, in which the light emitting portion or the light incident portion is mounted on the block such that an optical axis direction of the light emitting portion or the light incident portion is inclined with respect to a longitudinal direction of the connector exterior.

(2) The optical connector according to (1), in which the connector exterior has a length at which at least a part of light emitted from the light emitting portion can be emitted to an inner side of the connector exterior.

(3) The optical connector according to (2), in which an optical signal emitted to the inner side of the connector exterior is diffused by a surface of the inner side, and power of light exposed outside satisfies a safety standard.

(4) The optical connector according to any of (1) to (3), in which the block is movably provided, and a biasing portion is further included for biasing the block toward a mating connector in a state in which the block starts contact with a block of the mating connector.

(5) The optical connector according to (4), further including a locking portion that holds a fitted state against biasing force by the biasing portion when the optical connector is fitted to the mating connector.

(6) An optical cable including an optical connector as a plug, in which the optical connector includes:

a cylindrical connector exterior; and a block that is incorporated in one end side of the connector exterior and in which a light emitting portion or a light incident portion is mounted toward another end side of the connector exterior, and the light emitting portion or the light incident portion is mounted on the block such that an optical axis direction of the light emitting portion or the light incident portion is inclined with respect to a longitudinal direction of the connector exterior.

(7) The optical cable according to (6), in which the connector exterior has a length at which at least a part of light emitted from the light emitting portion can be emitted to an inner side of the connector exterior.

(8) An electronic device including an optical connector as a receptacle, in which the optical connector includes:

a cylindrical connector exterior; and a block that is incorporated in one end side of the connector exterior and in which a light emitting portion or a light incident portion is mounted toward another end side of the connector exterior, and the light emitting portion or the light incident portion is mounted on the block such that an optical axis direction of the light emitting portion or the light incident portion is inclined with respect to a longitudinal direction of the connector exterior.

(9) The electronic device according to (8), in which the connector exterior has a length at which at least a part of light emitted from the light emitting portion can be emitted to an inner side of the connector exterior.

REFERENCE SIGNS LIST

10A, 10B, 20A, 20B, 30A, 30B, 40A, 40B Optical connector
11A, 11B, 21A, 21B, 31A, 41B Connector exterior
12A, 12B, 22A, 22B, 32A, 42B Block
33A, 43B Mirror structure
100 Electronic device
110 Transmission/reception unit
111A, 111B, 211A, 211B, 311A, 411B Light diffusing portion
120 Transmission unit
130 Reception unit
121A, 121B, 221B, 321A, 421B Lens
122A, 122B Holding portion
123B Regulating projection
124B Regulating recess
1111A Locking groove
1111B Locking spring
2022B Spring
200 Optical cable
201 Optical cable body 202A, 202B Optical transmission line
202A' Electrical transmission line
203A Optical waveguide
204A Mirror structure
221A Optical element
901 CPU
907 Host bus
909 Bridge
911 External bus
913 Interface
915 Input device
917 Output device
919 Storage device
921 Drive
923 Connection port
925 Communication device
927 Removable recording medium
929 External connection device
931 Communications network
7000 Vehicle control system
7010 Communication network
7100 Drive system control unit
7110 Vehicle state detecting unit
7200 Body system control unit
7300 Battery control unit
7310 Secondary battery
7400 Vehicle exterior information detection unit
7410 Imaging unit
7420 Vehicle exterior information detecting unit
7500 Vehicle interior information detection unit
7510 Driver state detecting unit
7600 Integrated control unit
7610 Microcomputer
7640 Positioning unit
7650 Beacon reception unit
7670 Audio image output unit
7690 Storage unit
7710 Audio speaker
7720 Display unit
7730 Instrument panel
7750 External environment
7760 Vehicle interior device
7800 Input unit
7900 Vehicle
7910, 7912, 7914, 7916, 7918 Imaging unit
7920, 7922, 7924, 7926, 7928, 7930 Vehicle exterior information detecting unit

The invention claimed is:

1. An optical connector comprising:
a cylindrical connector exterior; and
a block that is incorporated in one end side of the connector exterior and in which a light emitting portion or a light incident portion is mounted toward another end side of the connector exterior,
wherein the light emitting portion or the light incident portion is mounted on the block such that an optical axis direction of the light emitting portion or the light incident portion is inclined with respect to a longitudinal direction of the connector exterior,
wherein the connector exterior includes a locking portion comprising at least one of a locking spring or a locking groove configured to fit a corresponding locking groove or a corresponding locking spring of a mating connector when the optical connector is fitted to the mating connector, and
wherein the block is movably provided, and a biasing portion is further included for biasing the block toward the mating connector in a state in which the block starts contact with a block of the mating connector.

2. The optical connector according to claim 1, wherein when the block includes the light emitting portion, the connector exterior has a length at which at least a part of light emitted from the light emitting portion is emitted toward an inner side of the connector exterior.

3. The optical connector according to claim 2, wherein an optical signal emitted to the inner side of the connector exterior is diffused by a surface of the inner side, in order to weaken a power of light exposed outside the optical connector when the optical connector is not fitted to the mating connector.

4. The optical connector according to claim 3, wherein the surface of the inner side of the connector exterior comprises an anodized aluminum layer.

5. The optical connector according to claim 1,
wherein the locking portion holds a specific position against biasing force by the biasing portion when the optical connector is fitted to the mating connector.

6. An optical cable comprising an optical connector configured as a plug,
wherein the optical connector includes:
a cylindrical connector exterior; and
a block that is incorporated in one end side of the connector exterior and in which a light emitting portion or a light incident portion is mounted toward another end side of the connector exterior,
wherein the light emitting portion or the light incident portion is mounted on the block such that an optical axis direction of the light emitting portion or the light incident portion is inclined with respect to a longitudinal direction of the connector exterior,
wherein the connector exterior includes a locking portion comprising at least one of a locking spring or a locking groove configured to fit a corresponding locking groove or a corresponding locking spring of a mating connector when the optical connector is fitted to the mating connector, and
wherein the block is movably provided, and a biasing portion is further included for biasing the block toward the mating connector in a state in which the block starts contact with a block of the mating connector.

7. The optical cable according to claim 6, wherein when the block includes the light emitting portion, the connector exterior has a length at which at least a part of light emitted from the light emitting portion is emitted toward an inner side of the connector exterior.

8. An electronic device comprising an optical connector configured as a receptacle,
wherein the optical connector includes:
a cylindrical connector exterior; and
a block that is incorporated in one end side of the connector exterior and in which a light emitting portion or a light incident portion is mounted toward another end side of the connector exterior,
wherein the light emitting portion or the light incident portion is mounted on the block such that an optical axis direction of the light emitting portion or the light incident portion is inclined with respect to a longitudinal direction of the connector exterior,
wherein the connector exterior includes a locking portion comprising at least one of a locking spring or a locking groove configured to fit a corresponding locking groove or a corresponding locking spring of a mating connector when the optical connector is fitted to the mating connector, and wherein the block is movably provided, and a biasing portion is further included for biasing the block toward the mating connector in a state in which the block starts contact with a block of the mating connector.

9. The electronic device according to claim 8, wherein when the block includes the light emitting portion, the connector exterior has a length at which at least a part of light emitted from the light emitting portion is emitted toward an inner side of the connector exterior.

* * * * *